United States Patent
Sugai et al.

(10) Patent No.: US 6,874,033 B1
(45) Date of Patent: Mar. 29, 2005

(54) NETWORK REPEATER AND NETWORK NEXT TRANSFER DESITINATION SEARCHING METHOD

(75) Inventors: Kazuo Sugai, Zama (JP); Takeshi Aimoto, Sagamihara (JP); Nobuhito Matsuyama, Hadano (JP); Shinichi Akahane, Ebina (JP); Noboru Tanabe, Hadano (JP); Yoshihito Sako, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/622,484

(22) PCT Filed: Mar. 23, 1998

(86) PCT No.: PCT/JP98/01232

§ 371 (c)(1),
(2), (4) Date: Jan. 2, 2000

(87) PCT Pub. No.: WO99/49618

PCT Pub. Date: Sep. 30, 1999

(51) Int. Cl.[7] .......................................... G06F 15/173
(52) U.S. Cl. ................. 709/238; 709/238; 709/240; 709/241; 709/245; 398/49
(58) Field of Search ................ 709/240–241, 709/245; 398/49

(56) References Cited

U.S. PATENT DOCUMENTS 5,506,838 A * 4/1996 Flanagan ............... 370/258
5,651,002 A * 7/1997 Van Seters et al. ......... 370/392
6,173,384 B1 * 1/2001 Weaver ..................... 711/216
6,370,144 B1 * 4/2002 Chao et al. .............. 370/395.42
6,389,031 B1 * 5/2002 Chao et al. ................. 370/412

FOREIGN PATENT DOCUMENTS

| JP | 11341076 | 12/1999 |
| JP | 115243 | 4/2000 |

OTHER PUBLICATIONS

Microsoft Press. Microsoft Computer Dictionary, 2002, 5th edition, p. 329.*

Art Working Group, 1996. pp. 103–115.

* cited by examiner

Primary Examiner—Jack Harvey
Assistant Examiner—Mitra Kianersi
(74) Attorney, Agent, or Firm—Antonelli, Terry, Stout & Kraus, LLP

(57) ABSTRACT

The present invention improves a network forwarding device, such as a router, in a computer network system. When an address to which a received packet is to be forwarded is searched for based on path information, a path search data structure is changed to the one in which, in a 2-branch tree search in which a destination address of the received packet is checked, one bit at a time beginning at a highest-order bit, p (p is an integer equal to or larger than 2) levels are combined into one $2^P$-branch tree to perform a search of the p levels of the 2-branch tree as a one-level search. This data structure speeds up path search processing.

9 Claims, 30 Drawing Sheets

FIG. 4

PATH TABLE

| SUB-NETWORK ADDRESS | / | MASK LENGTH |
|---|---|---|
| 000 | / | 0 |
| 001 | / | 3 |
| 010 | / | 2 |
| 100 | / | 1 |
| 110 | / | 3 |

FIG. 6

PATH TABLE

| SUB-NETWORK ADDRESS | / | MASK LENGTH |
|---|---|---|
| 0x00. 00. 00. 00 | / | 0 |
| 0x85. 04. 00. 00 | / | 16 |
| 0x85. 05. 00. 00 | / | 16 |

FIG. 9
(a)
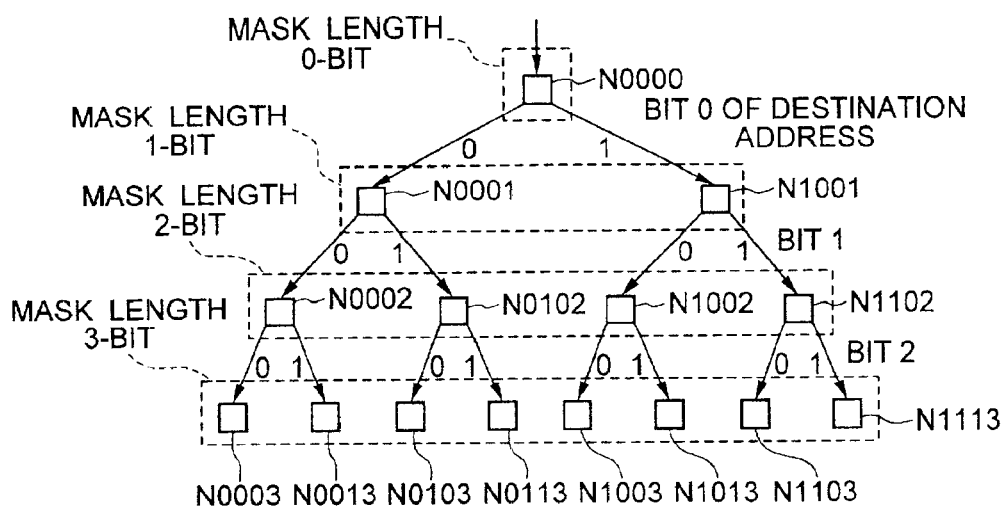
(b)
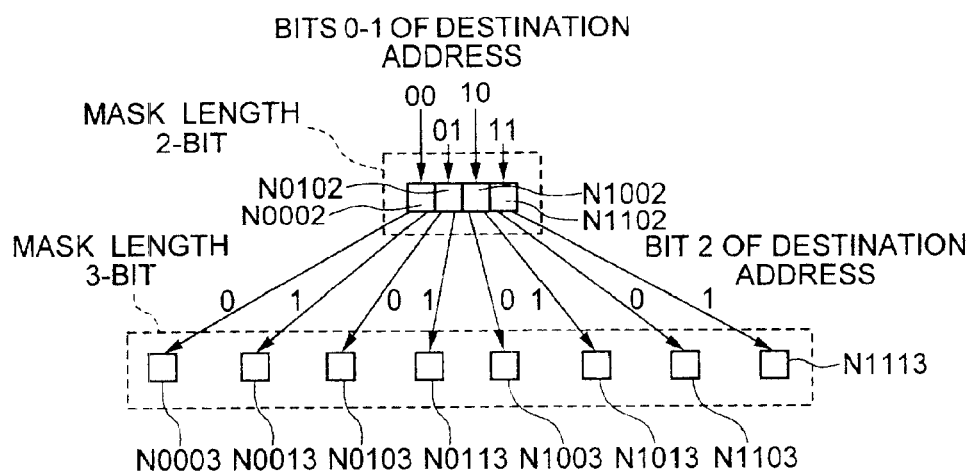

FIG. 21
(a)
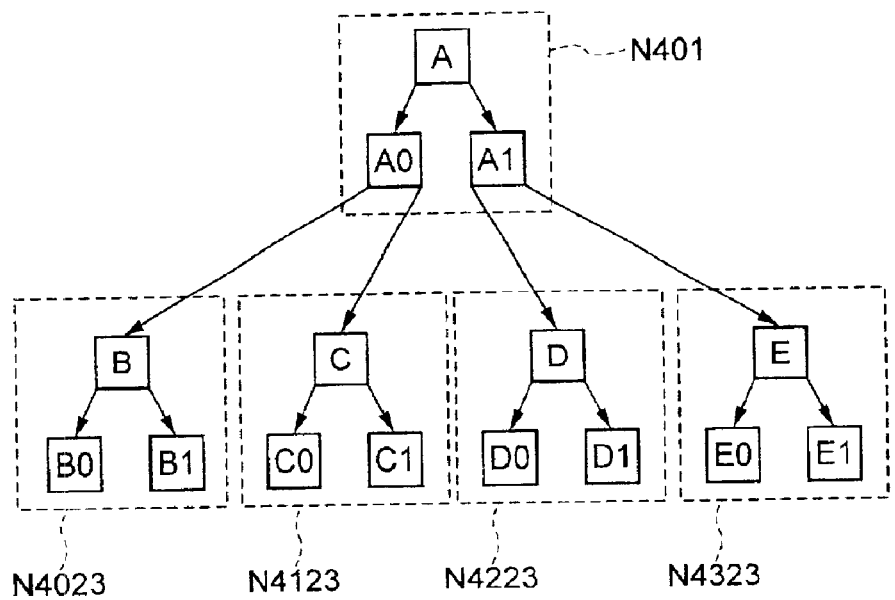
(b)
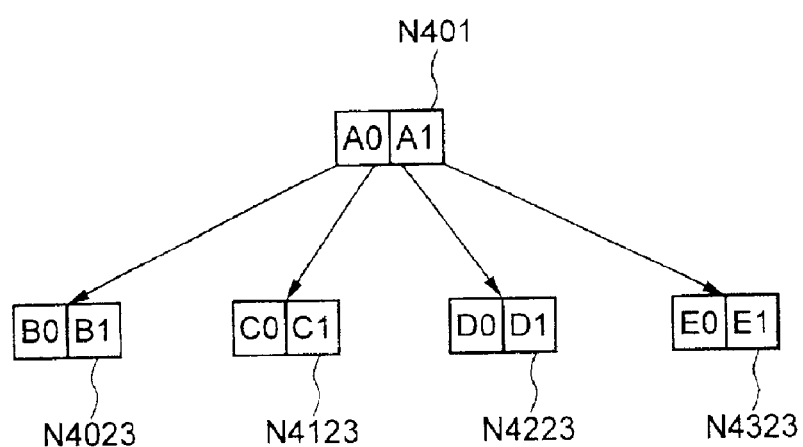

FIG. 31
(a)
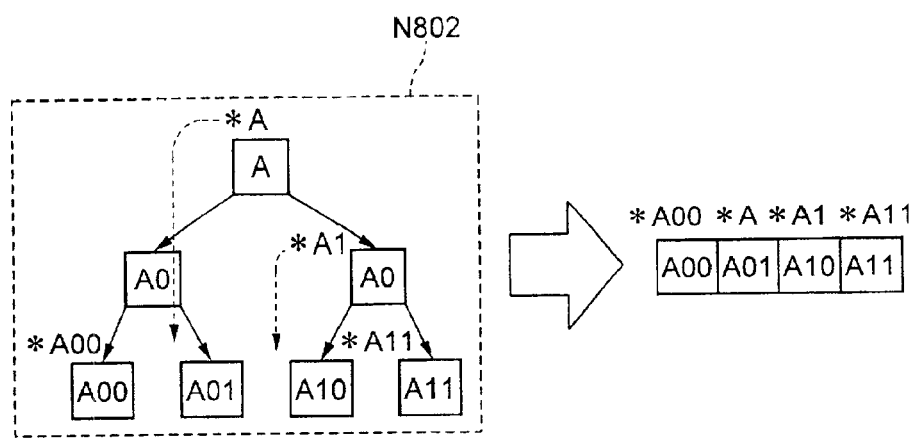
(b)
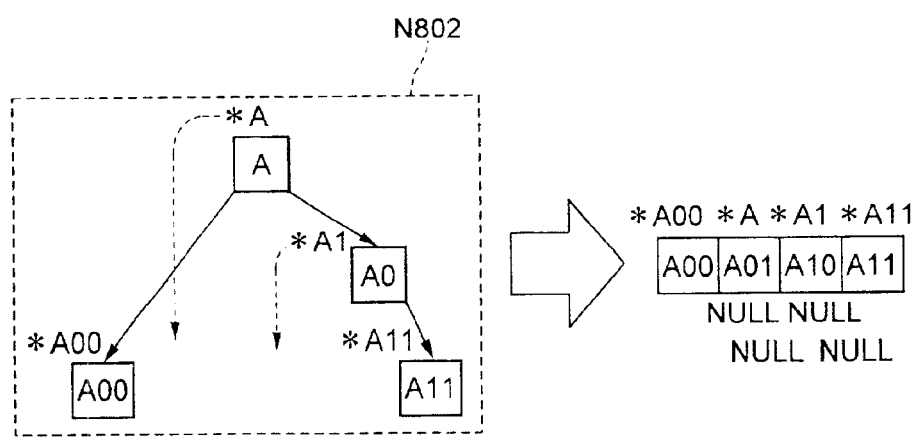

FIG. 33
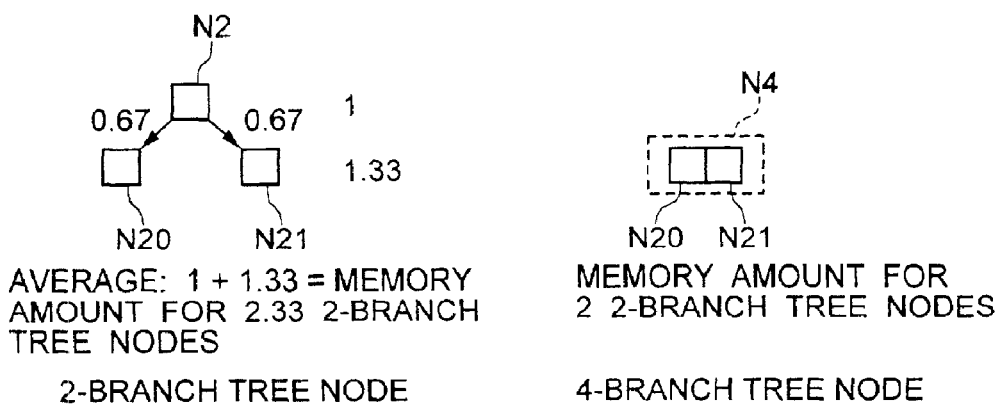
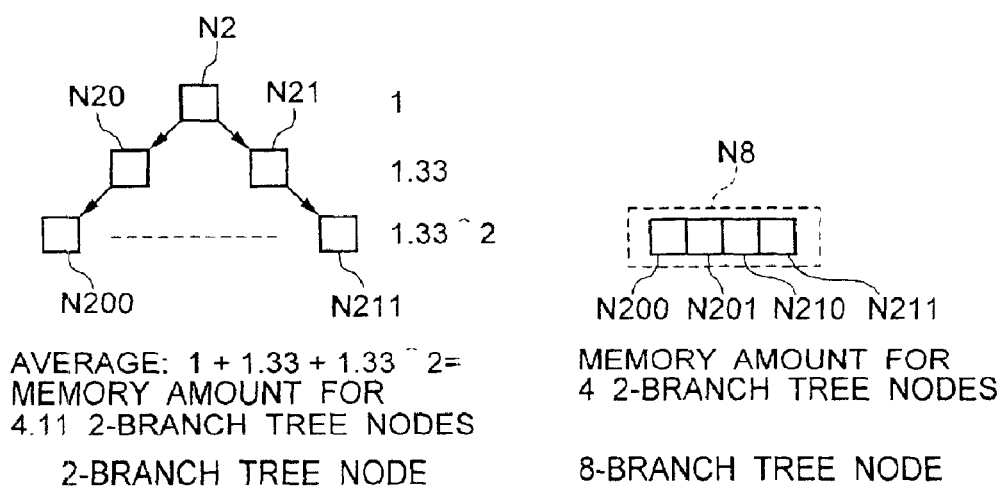

2-BRANCH TREE NODE

4-BRANCH TREE NODE

4-BRANCH TREE NODE

NETWORK REPEATER AND NETWORK NEXT TRANSFER DESITINATION SEARCHING METHOD

TECHNICAL FIELD

The present invention relates to a network forwarding device such as a router on a computer network system. More particularly, the present invention relates to a network forwarding device and a network next-hop search method for quickly searching for an address to which a packet, received by a network forwarding device, is to be forwarded based on the destination address contained in the packet.

BACKGROUND ART

In a network system, network forwarding devices such as routers are used to connect a plurality of subnets. A router checks the destination address of a packet received from a subnet to which the router is connected, determines the next hop, and forwards the received packet to the subnet to which the next-hop router or the host is connected. FIG. 1 shows the configuration of a general network system composed of a plurality of subnets connected by routers.

In FIG. 1, R1 and R2 are routers, SN1 is a sub network connected to port P11 of router R1, SN2 is a sub network connected to port P12 of router R1 and port 21 of router R2, H10 and H11 are hosts connected to subnet SN1, H20 and H21 are hosts connected to subnet SN2, and H30 and H31 are hosts connected to subnet SN3.

When a packet is sent from host H10 to host H21, router R1 checks the destination address DA stored in the packet as the header information to find that destination host H21 is on subnet SN2 and that subnet SN2 is connected directly to router R1. Then, router R1 outputs the packet to port P12 which connects to subnet SN2. When outputting the packet, router R1 sets the destination host (H21) as the address to which the packet to is be forwarded next (next hop address).

When a packet is sent from host H10 to host H31, router R1 checks the destination address DA stored in the packet as the header information to find that destination host H31 is on subnet SN3 and that subnet SN3 is connected not directly to router R1 but via router R2. Router R1 outputs the packet to port P21 connected to subnet SN2 to which router R2 is connected. When outputting the packet, router R1 sets router R2 as the address to which the packet to is be forwarded next (next hop address). Upon receiving the packet, router R2, like router R1, checks the destination address DA and forwards the packet to host H31.

Next, referring to FIG. 2, the following describes the search specification used by a router, which has received a packet, to search for the address to which the packet is to be forwarded next and the port to which the packet is to be output. TBL, a path search table, contains configuration definition information entered manually and information acquired through communication of connection information between routers.

With the set of a sub-network address and a sub-network mask length as the search key, the path search table TBL is used to search for an output port, next hop address, and information indicating whether or not the sub-network is connected directly (hereafter called next hop information).

In the path search specification, the mask beginning with the most significant bit and extending for the number of bits indicated by the sub-network mask length is multiplied by the destination address for comparison with a sub-network address. As a result of comparison, multiple entries E1, E2, and E4 with different mask lengths match. Out of the matching entries, the next hop information (next hop 2) of E2 with the longest mask is selected as the search result.

The Radish algorithm is known as one of the quick search methods in accordance with this search specification. The Radish algorithm is described, for example, in "Let's read kernel (8) Path control mechanism at IP layer (2)" by Hide Yamaguchi, pp. 20–25 in UNIX MAGAZINE, April, 1997.

The following describes the Radish algorithm. The Radish algorithm maps the nodes of a tree structure composed of multiple pointer-connected nodes, each having the left and right pointers, to the path entries. When this tree is followed, the left or right pointer of each node is selected to move to the next node until the node to which the desired path entry is mapped is reached.

First, referring to FIG. 3, the tree structure will be described. Because the concept of the tree structure does not depend on the number of bits, the address is three bits in length in FIG. 3 for easy understanding.

As shown in FIG. 3, the nodes are called, beginning with the top of the tree, 0-bit mask node, 1-bit mask nodes, 2-bit mask nodes, and 3-bit mask nodes.

In the 0-bit mask node N0000, one of the left and right pointers is selected according to whether bit 0 of the destination address is 0 or 1 to move down to 1-bit mask node N0001 or N1001. In a 1-bit mask node, one of the left and right pointers is selected according to whether bit 1 is 0 or 1 to move down to 2-bit mask node N0002, N0102, N1002, or N1102. In a 2-bit mask node, one of the left and right pointers is selected according to whether bit 2 is 0 or 1 to move down to 3-bit mask node N0003, N0013, N0103, N0113, N1003, N1013, N1103, or N1113.

When searching for a desired destination address through pointers, beginning at 0-bit mask node N000 of the tree, according to whether the bit is 0 or 1, the 0-bit mask node is always selected. 1-bit mask node N0001 or N1001 is selected, beginning with the left end, when the bits of the destination address is 0XX or 1XX, respectively. 2-bit mask node N0002, N0102, N1002, or N1102 is selected, beginning with the left end, when the bits of the destination address is 00X, 01X, 10X, or 11X, respectively. 3-bit mask node N0003, N0013, N0103, N0113, N1003, N1013, N1103, or N1113 is selected, beginning with the left end, when the bits of the destination address is 000, 001, 010, 011, 100, 101, 110, or 111, respectively. X indicates a 'don't care' bit, that is, any bit value, 0 or 1, is acceptable.

Therefore, 0-bit mask node N0000 is selected when the destination address belongs to the sub-network address 000/0. 1-bit mask node N0001 or N1001 is selected when the destination address belongs to the sub-network address 000/1 or 100/1. 2-bit mask node N0002, N0102, N1002, or N1102 is selected when the destination address belongs to the sub-network address 000/2, 010/2, 100/2, or 110/2. 3-bit mask node N0003, N0013, N0103, N0113, N1003, N1013, N1103, or N1113 is selected when the destination address belongs to the sub-network address 000/3, 001/3, . . . or 111/3. The notation "sss/m" indicates that "sss" represents a sub-network address and m represents the mask length.

As described above, the nodes of this tree correspond, one to one, with all subnets each with a unique sub-network address and a mask length.

Nodes N0000, N0013, N0102, N1001, and N1103, which correspond to the entries of the path table shown in FIG. 4, are attached "*" in the tree. When the destination address DA011 is searched for in this tree by checking the pointers if each bit is 0 or 1, it is found that nodes N0000 and N0102, which have "*" attached, correspond to the matching entries. When there are a plurality of path table entries that match the destination address, the rule is that the longest mask-length sub-network is selected. That is, out of matching nodes N0000 and N0102 to which "*" is attached, the path information allocated to node N0102 nearest to the end point is selected as the search result of the path table.

As shown in the search method described above, those nodes to which "*" is not attached and which are not intermediate paths to a node with "*" attached, that is, N0003, N0103, N0113, N1003, N1013, N1113, and N1002, do not affect the search result if removed from the tree. Rather, when "*" is not attached to the bottom-level node, the search becomes more efficient because the search ends before reaching the bottom level. FIG. 5 shows a tree created by removing nodes to which "*" is not attached and which are not intermediate path to a node to which "*" is attached.

FIG. 7 shows a 2-branch (binary) tree which corresponds to the 32-bit address path table shown in FIG. 6 and which is created by the method described above. As shown in the figure, a long string NS1 of nodes with neither a branch nor a "*" is created. The following describes the quick search method in which only one of left and right pointers of a node connects to the next node and the nodes to which path entries are not mapped are removed.

In this quick search method, node string NS1 with no branch or "*" is removed and the immediate higher-level node N000000000 of the removed node string NS1 is connected to the immediate lower-level node N8504000015 in the branch direction (right side in FIG. 7). The resulting tree is shown in FIG. 8. Removing the intermediate nodes like this is called the reduction of a tree.

Next, the path search method for a reduced tree will be described.

In the example shown in FIG. 8, immediately after bit 0 of the 0-bit mask node N000000000 is checked, 15-bit mask node N8504000015 is checked. Therefore, even if bit 15 of 15-bit mask node N850400015 is checked, the intermediate bits, bit 1 to bit 14, cannot be checked. To check bits 1 to 15 in one search operation, bits 1 to 15 of the destination address are compared with bits 1 to 15 of the sub-network address 0x85.04.00.00 of node N8504000015. An equal comparison indicates that the intended node is reached, that is, the node would be reached also by comparing them, one bit at a time, in a non-reduced tree. An unequal comparison indicates that a non-intended node is reached, that is, there would be no destination in the non-reduced tree.

In FIG. 8, an equal condition always occurs in bit 0 because the branch is already selected based on the equality. In general, if a check is made each time a node is reached to see if the correct node is reached, it is guaranteed that the destination address equals the sub-network address of the node for the mask length beginning with bit 0. Thus, when the next node is reached, whether the correct node is reached is checked by comparing the destination address with the sub-network address for the mask length beginning with bit 0 regardless of how many bits were tested before.

DISCLOSURE OF THE INVENTION

As described above, the problem with the Radish algorithm is that it takes long because the algorithm checks destination addresses from the top downward, one bit at a time, to search for a path.

It is an object of the present invention to provide a network forwarding device, especially a router, that executes quick path search processing when transferring packets.

It is another object of the present invention to provide a network next-hop search method, for use in a network forwarding device such as a router, that checks the destination address stored in a received packet to quickly search for a packet forwarding address.

To achieve the above object, the method according to the present invention expands several high-order bits of a sub-network address into fixed positions in the memory during the search for a part corresponding to the high-order bits of the sub-network address. This method eliminates the time required for the search for the several high-order bits of the sub-network address.

In addition, several high-order bits of the nodes of a search tree are contained in a search processing LSI. Search processing in the internal memory of the LSI and search processing in the external memory are performed in pipeline mode to hide the time required for searching for several high-order bits.

In addition, the number of branches of a node of a search tree, which is two branches in the prior art node, is increased in increments of a power of 2, such as 4-branch tree nodes, 8-branch tree nodes and more. This method increases the number of bits to be tested at a time from one bit for each node to continuous two, three, and more bits, thereby decreasing the number of nodes to be followed until the end of search.

In addition, to reduce the amount of memory for storing a data structure representing a search tree when configuring a 4-branch tree, an 8-branch tree, and more in general, a $2^P$-branch tree, a total of ($2^P$–1) 2-branch tree nodes, composed of one 2-branch tree node and immediately lower 2-branch tree nodes of (p–1) levels, are combined into one 2P-tree node and, into the combined lowest-level $2^{(p-1)}$ 2-branch tree nodes, path data allocated to higher-level nodes is embedded to form the $2^P$-tree node with $2^{(p-1)}$ 2-branch tree nodes. Furthermore, only one copy of a sharable element is provided.

In addition, when a 4-branch tree node, 8-branch tree node, or more-branch tree node composed of a plurality of 2-branch tree nodes is read for search, only a required part, not the whole, of the node is read to prevent the read time from increasing as the node becomes larger. To select only the required part of node data, node mask length information is necessary before the node data is read. Thus, each node contains the mask length of the immediately-lower node. Furthermore, at the start of each node, a flag indicating whether or not a path is allocated to the node is provided. This flag is read first to prevent path information for a node, to which a path is not allocated, from being read. This reduces the data read time.

BRIEF DESCRIPTION OF THE DRAWINGS

FIG. 4 is a diagram showing an example of a path table when the address is three bits long.

FIG. 6 is a diagram showing an example of a path table when the address is 32 bits long.

FIG. 9 is a diagram showing a tree whose 2-bit mask node is expanded in memory to eliminate the search time for bits 0–1.

FIG. 21 is a diagram showing a tree created by transforming three 2-branch tree nodes, which are combined into one 4-branch tree node, into two 2-branch tree nodes when transforming a 2-branch tree to a 4-branch tree.

FIG. 31 is a diagram showing how seven 2-branch nodes, which are combined into one 8-branch tree node, are transformed into four 2-branch tree nodes.

FIG. 33 is a diagram showing the comparison between the memory amount required when the tree is configured with 2-branch tree nodes and the memory amount required when the tree is configured with 4- and 8-branch tree nodes, with the node presence probability taken into consideration.

BEST MODE FOR CARRYING OUT THE INVENTION

To describe the present invention more in detail, the best mode for carrying out the present invention will be described with reference to the attached drawings.

Figure 38:
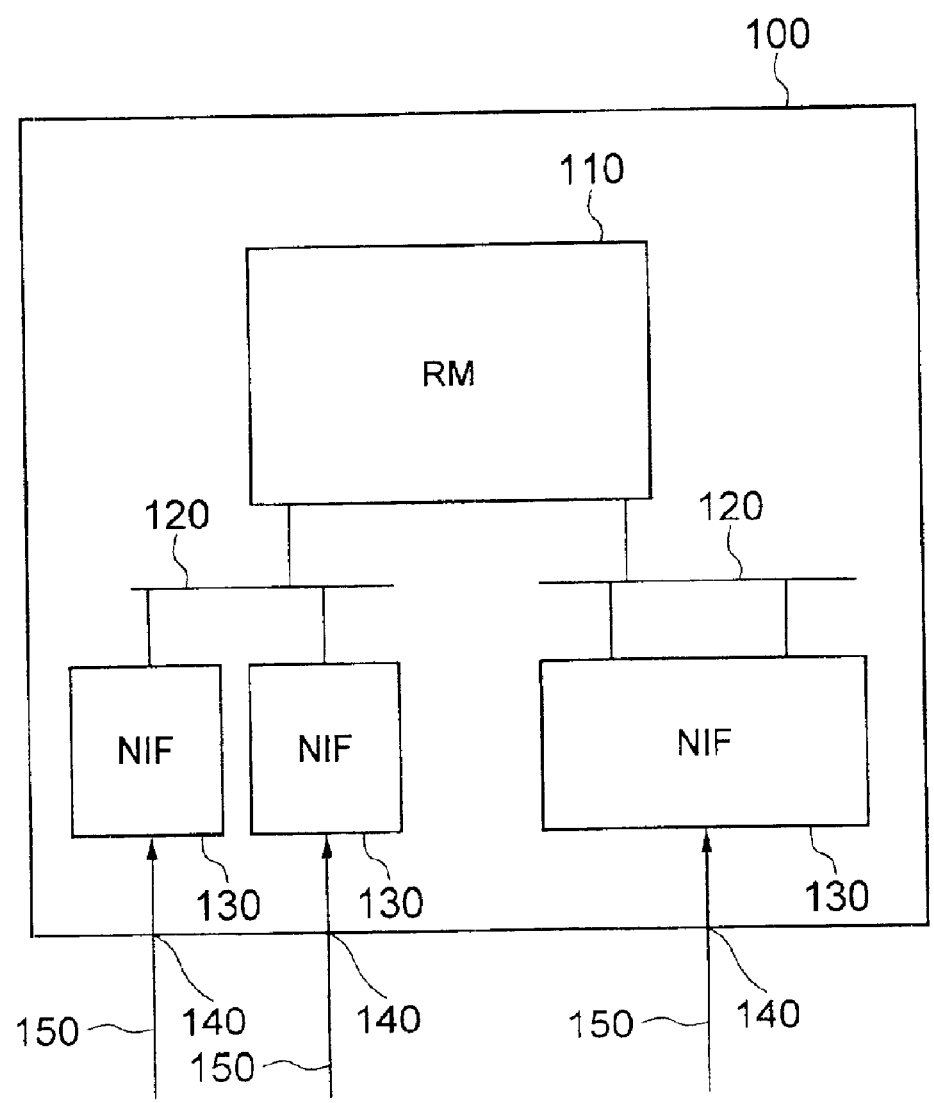
FIG. 38 is a block configuration diagram showing an example of the configuration of a router.

First, the typical configuration of a router to which the present invention applies will be described with reference to FIG. 38. In FIG. 38, number 100 is a router, number 110 is a routing controller, number 120 is a router bus, number 130 is a network interface, number 140 is a port, and number 150 is a sub-network.

The network interface 130 receives a packet from a sub-network connected to the port 140 and sends the received packet to the routing controller 110 via the router bus 120. The routing controller 110, with a routing table in which routing information is stored, checks the destination of the received packet with the use of the routing information to determine the sub-network 150 to which the packet is to be forwarded, and sends the packet to the network interface 130 of the port 140 to which the sub-network 150 is connected. Upon receiving the packet from the routing controller 110, the network interface 130 sends the packet to the sub-network 150 to which the packet is to be forwarded. The routing controller 110 updates and maintains the routing information stored in the routing table based on the header information of the received packet and, at the same time, manages the whole router 100.

Figure 39:
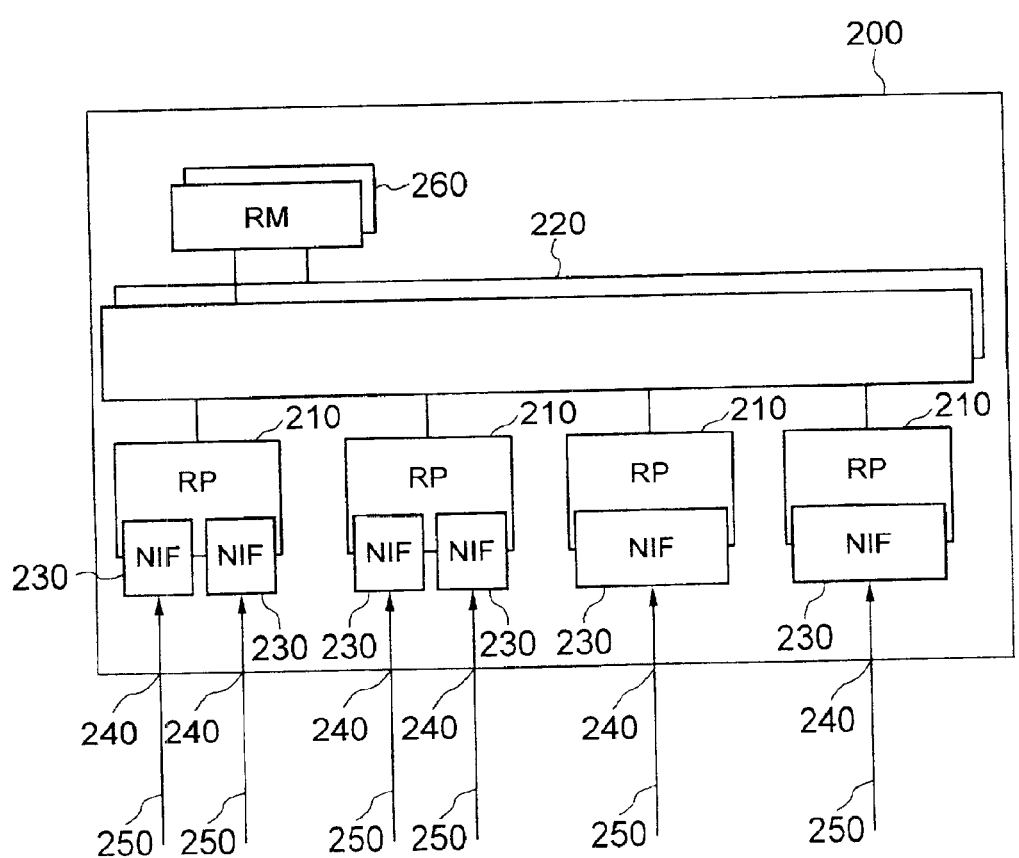
FIG. 39 is a block diagram showing an another example of the configuration of the router.

FIG. 39 is a block diagram showing another example of the configuration of the router. In FIG. 39, number 200 is a router, number 210 is a routing processor (RP), number 220 is intra-router communication means, number 230 is a network interface, number 240 is a port, number 250 is a sub-network, and number 260 is a router manager. In this configuration, the routing controller 110 shown in FIG. 38 is divided into two: the routing processor 210 that executes the routing function and the router manager 260 that manages the router 200. At the same time, there are a plurality of components each composed of one or more network interfaces 230, which are shown also in FIG. 38, and the routing processor 210. The router manager 260 manages the whole router 200 and, at the same time, distributes routing information to the routing processors 210. The intra-router communication means 220, a crossbar switch or a bus, performs communication among the routing processors 210 or between the routing processor 210 and the router manager 260. The routing processor 210, like the routing controller 110 shown in FIG. 38, transfers packets with the network interface 230 connected thereto. In addition, when the routing processor 210 transfers a packet to the sub-network 250 connected to some other routing processor 210, it transfers the packet to the corresponding routing processor 210 via the intra-router communication means 220.

Next, next-hop path search processing executed by the routing controller 110 and the routing processor 210 will be described. First, the high-speed method of the Radish algorithm according to the present invention will be described.

The first high-speed method will be described with reference to FIG. 9. When the tree is not reduced, the conventional Radish algorithm searches the tree for a path beginning at the 0-bit mask node, one bit at a time. On the other hand, the method according to the present invention expands the m-bit mask nodes in fixed positions in the memory, as shown in FIG. 9, regardless of whether m-bit mask nodes are present or not. FIG. 9 shows an example in which the 2-bit mask nodes, N0002, N0102, N1002, and N1102, are expanded in fixed positions in the memory.

In this case, the conventional method starts with 0-bit mask node N0000, jumps to one of 1-bit mask nodes N0001 and N1001 according to the value of bit 0, and reaches one of 2-bit mask nodes N0002 and N0102 or one of N1002 and N1102 according to the value of bit 1.

The method according to the present invention finds the address where 2-bit mask nodes N0002, N0102, N1002, and N1102 are expanded using the values of bits 0 and 1 and then jumps directly to one of 2-bit mask nodes N0002, N0102, N1002, and N1102. This reduces the search time by the period of time required for two node searches.

In general, jumping directly to a fixed position in the memory where the m-bit mask nodes are expanded reduces the search time by the time required for traversing m nodes from the 0-bit mask node to (m−1) bit mask nodes. On the other hand, this method decreases memory efficiency because the $2^m$ m-bit mask nodes must be expanded in memory regardless whether or not there are such nodes. Therefore, the value of m should be decided considering the trade-off between memory efficiency and performance.

Figure 1:
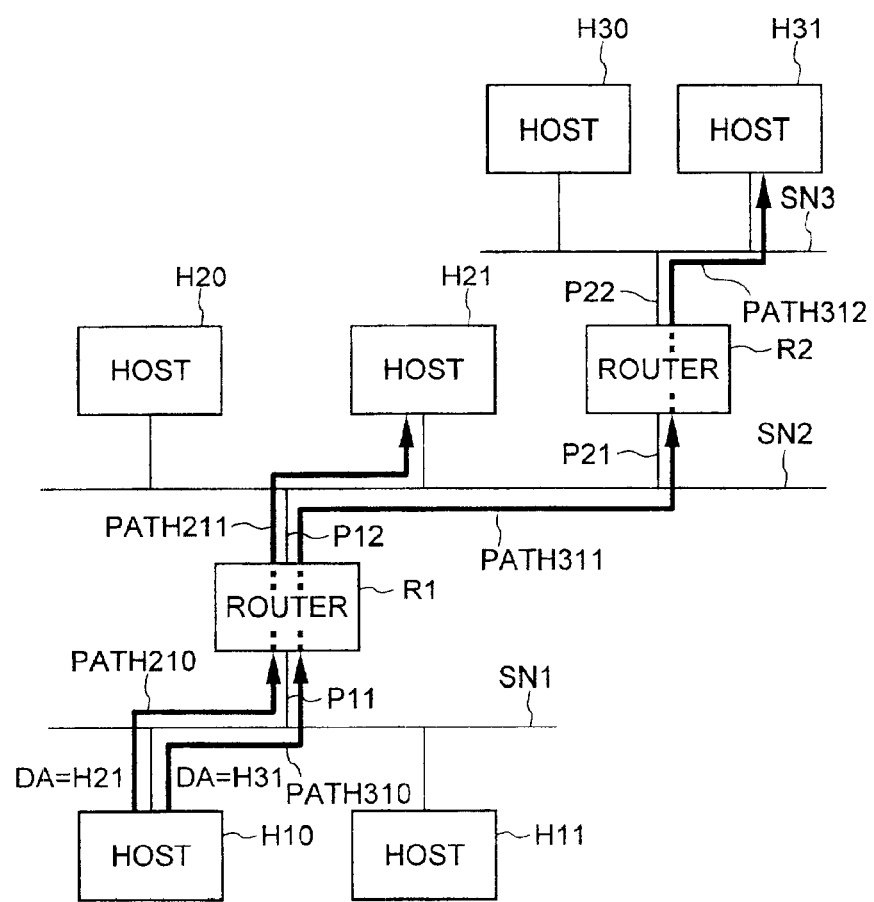
FIG. 1 is a diagram showing the configuration of a general network system to which the present invention applies.
Figure 2:
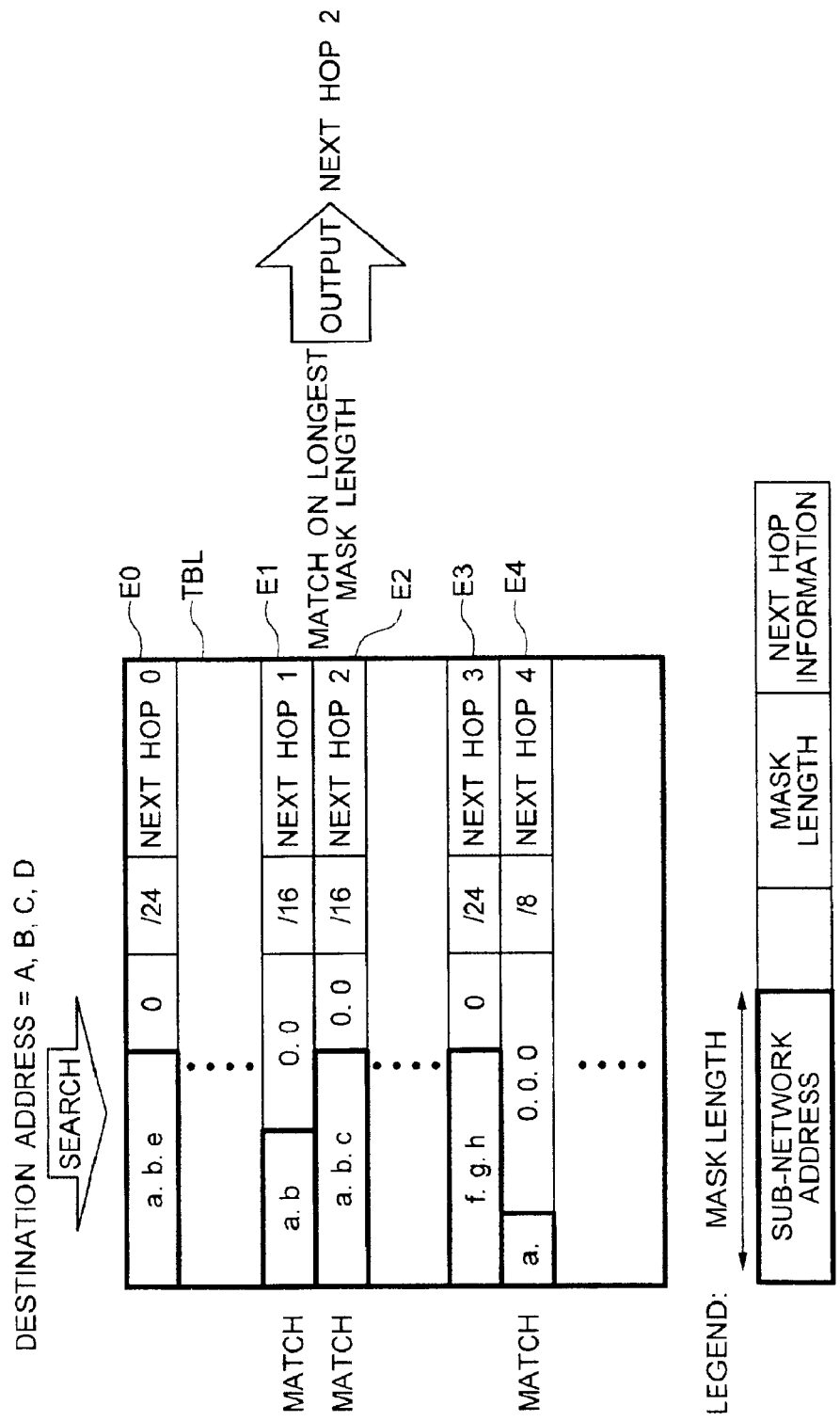
FIG. 2 is a diagram showing a path search specification for a router.
Figure 3:
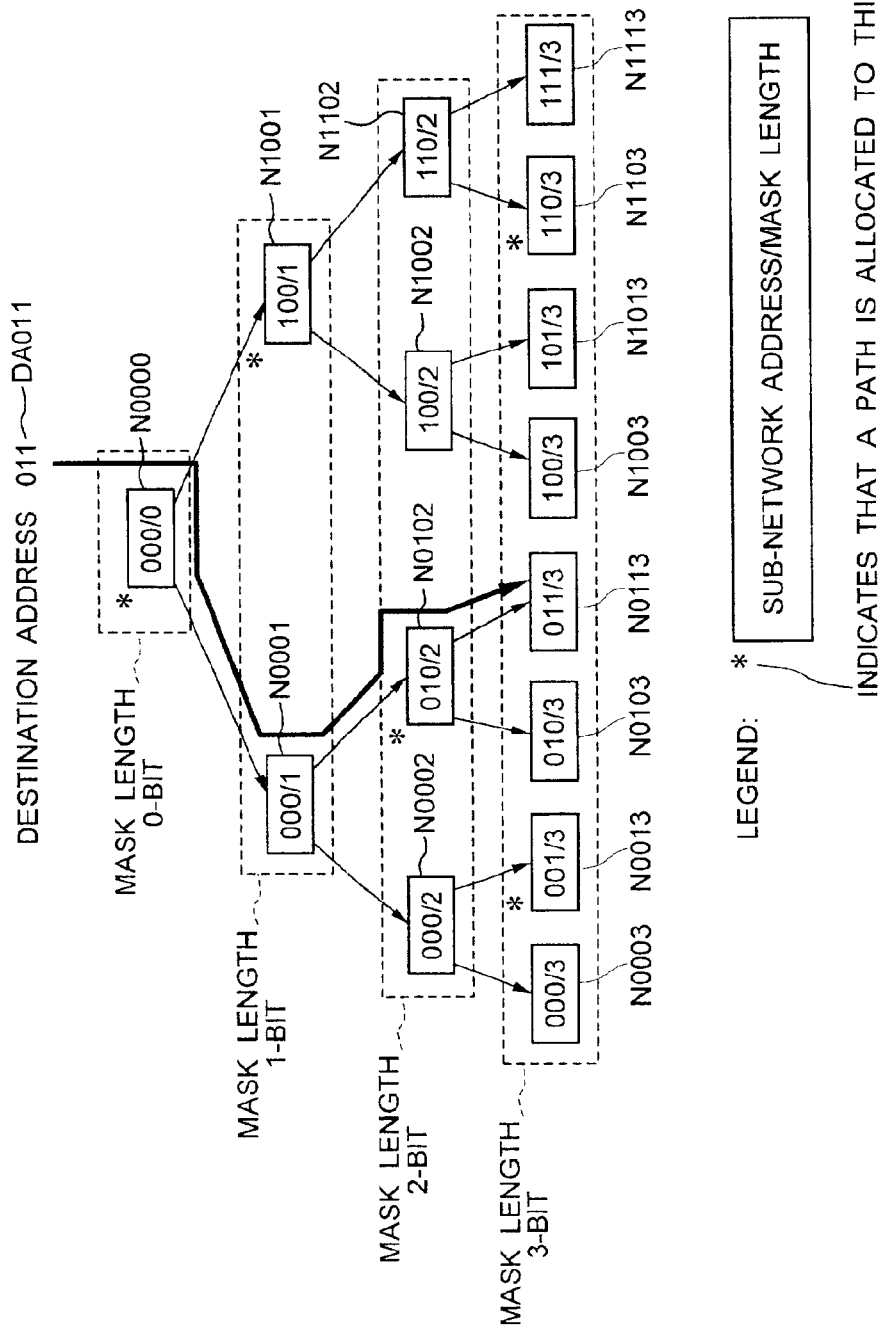
FIG. 3 is a diagram showing a 2-branch tree which has all nodes when the address is three bits long.
Figure 5:
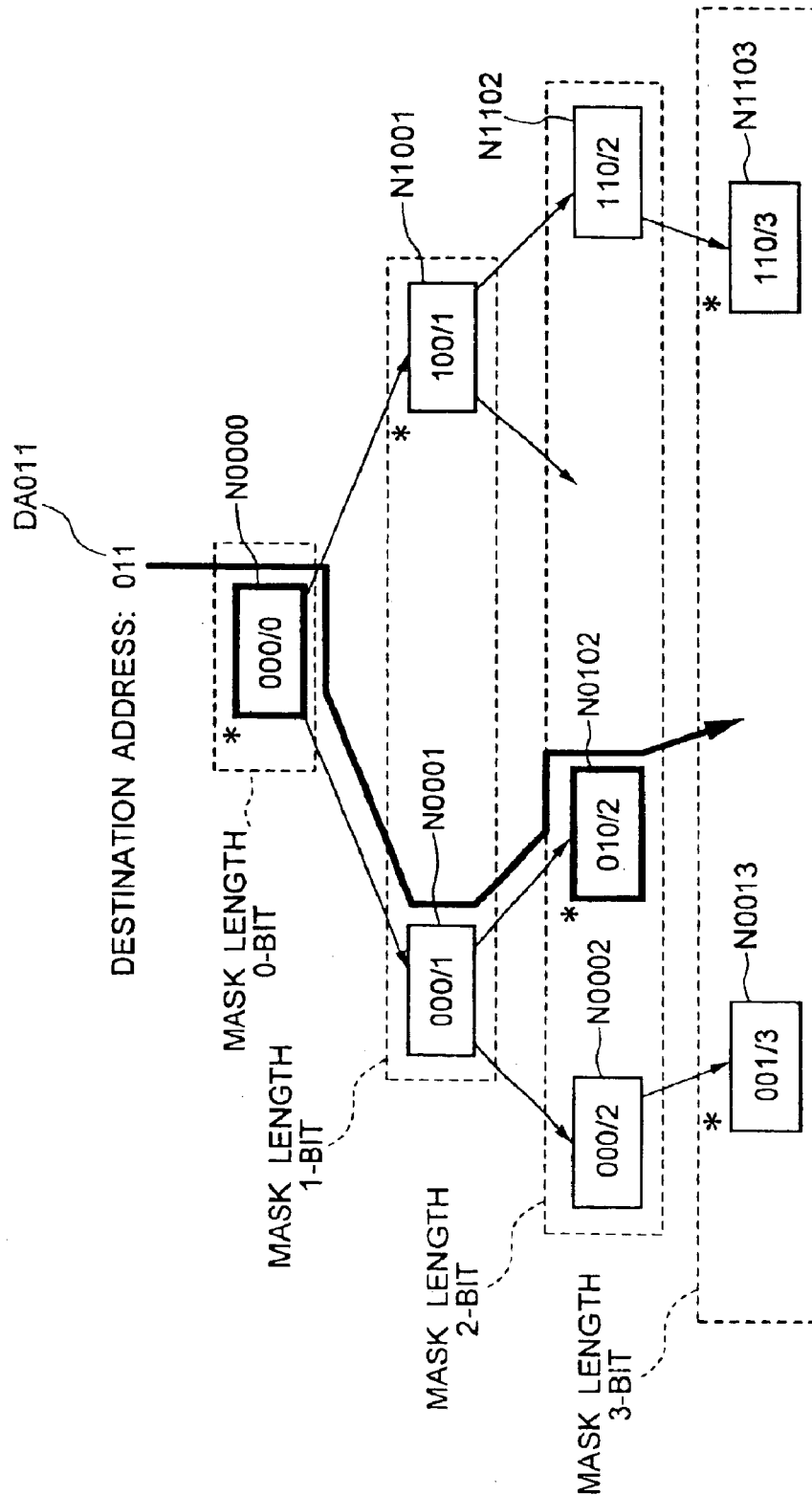
FIG. 5 is a diagram showing a tree from which a node which has no path and which is not an intermediate path to another node with a path is removed.
Figure 7:
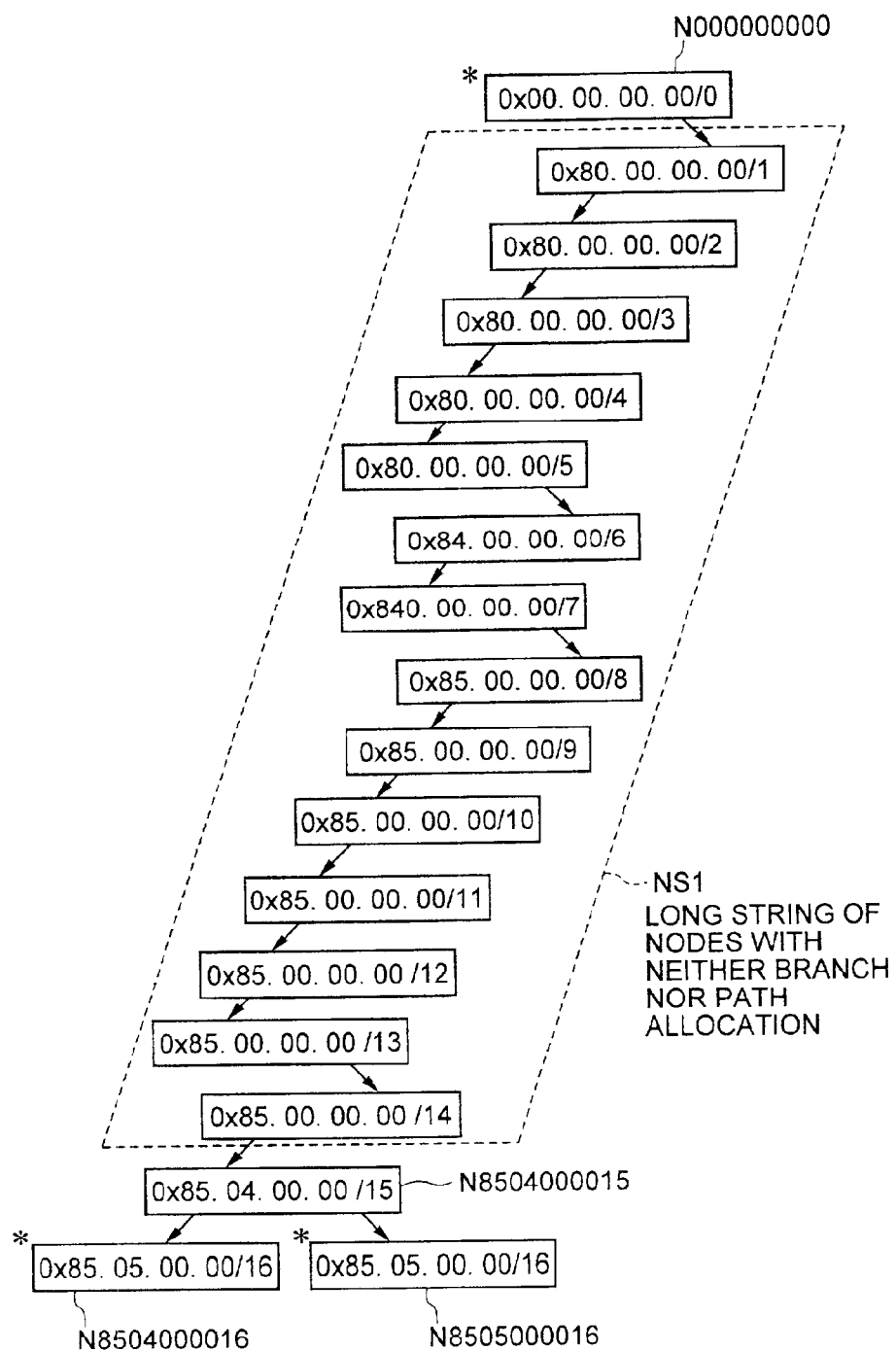
FIG. 7 is a diagram showing a tree corresponding to the path table shown in FIG. 6.
Figure 8:
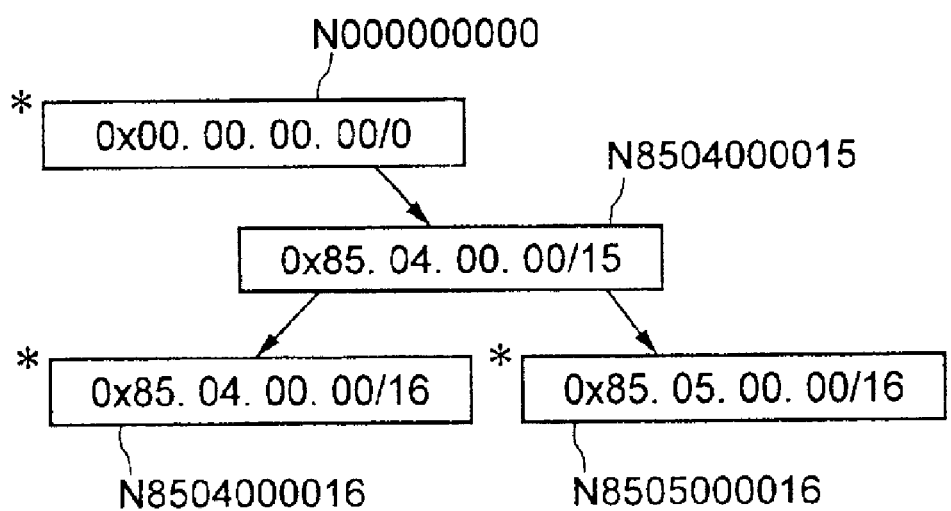
FIG. 8 is a diagram showing a tree from which a node which has no branch and to which no path is allocated is removed.
Figure 10:
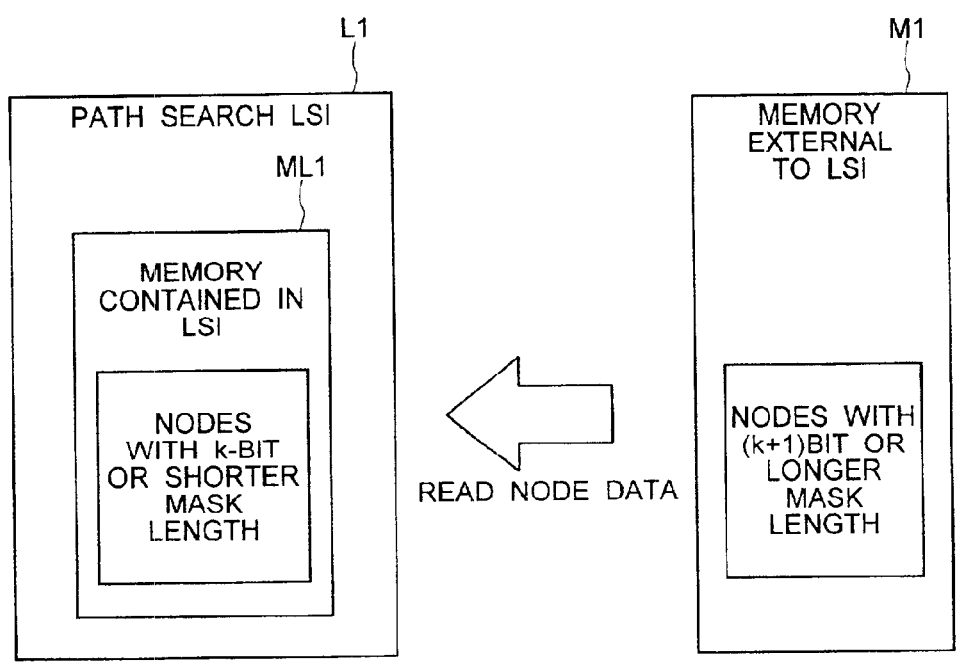
FIG. 10 is a diagram showing the configuration of memory in which nodes with a k-bit or shorter mask are stored in a path search LSI.

Next, the second high-speed method will be described with reference to FIGS. 10 to 12. As shown in FIG. 10, the nodes with a k-bit or shorter mask are expanded in memory ML1 contained LSI L1 in which path search is executed, while the nodes with a (K+1)bit or longer mask are expanded in memory M1 external to LSI L1. Because access to memory ML1 in LSI L1 is fast and because internal memory ML1 of LSI L1 is independent of external memory M1, pipeline processing is possible. This pipeline processing speeds up address search processing. In general, although the memory amount of LSI L1 is smaller than that of external memory, there is a small number of shorter-mask nodes. Therefore, the shorter-mask nodes may be contained in LSI L1.

Figure 11:
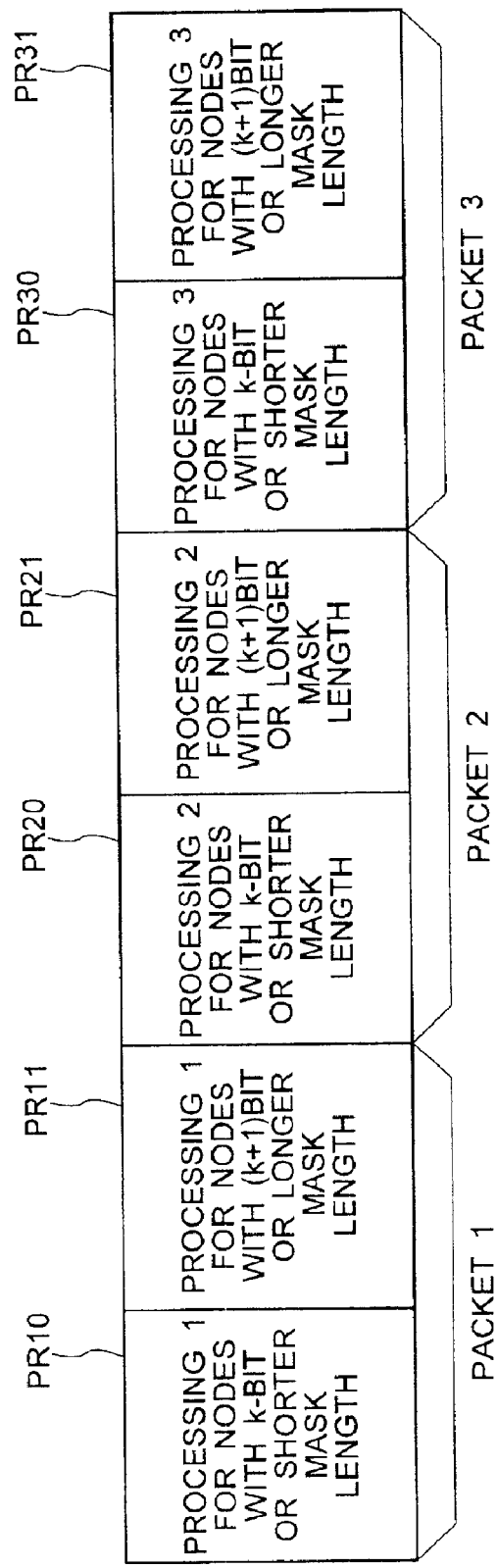
FIG. 11 is a diagram showing the timing chart of conventional path search processing where pipeline processing is not performed.
Figure 12:
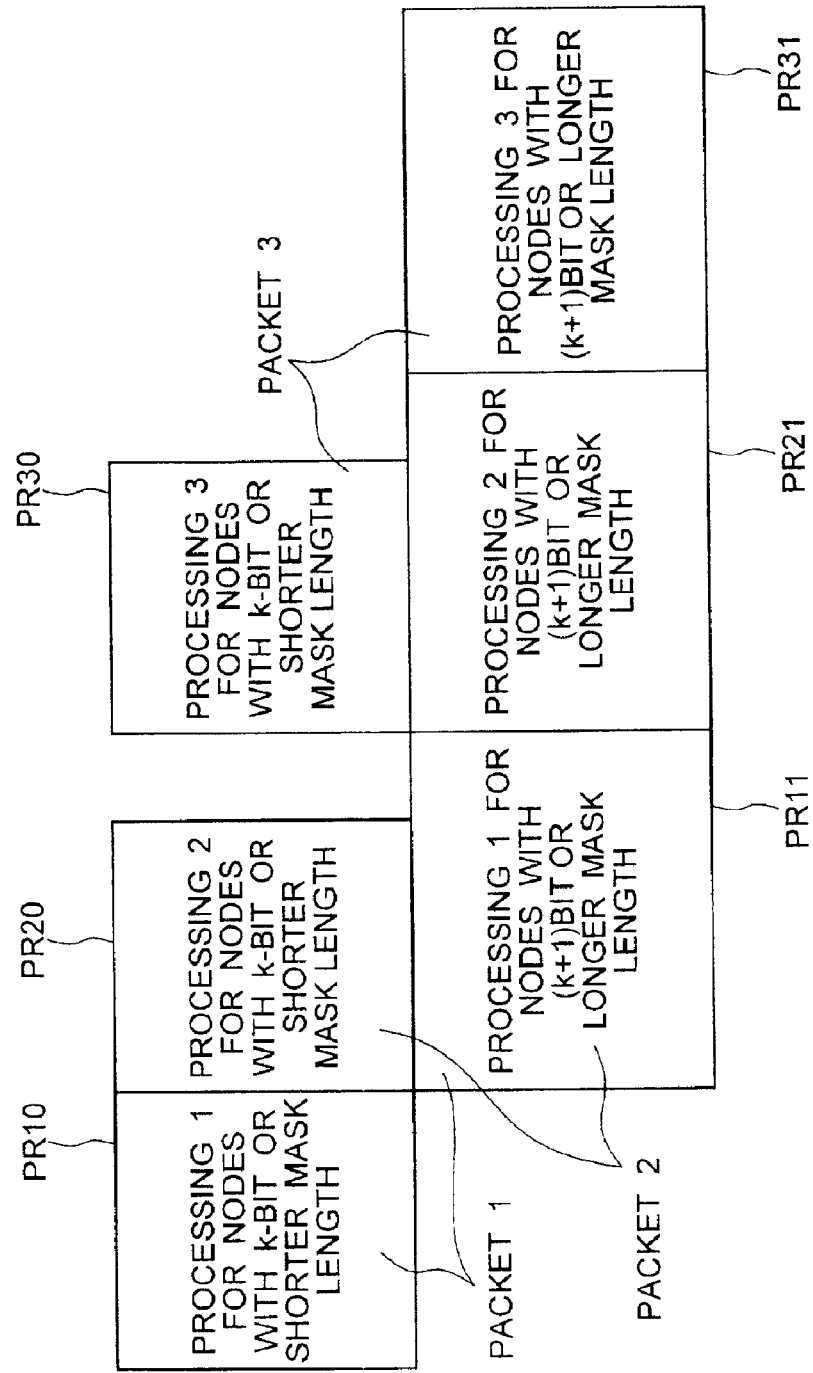
FIG. 12 is a diagram showing the timing chart of the pipeline processing of path search when the nodes with a k-bit or shorter mask are stored in a path search LSI.

FIG. 11 shows the timing chart of the conventional method in which no pipeline processing is executed. FIG. 12 shows the timing chart of path search processing according to the present invention that is executed in pipeline mode between the internal memory ML1 of LSI L1 and external memory M1. Conventionally, node search processing for packets (packets 1, 2, 3) is executed sequentially, as shown in FIG. 11. That is, node search processing PR10 for a k-bit or shorter mask and node search processing PR11 for a (k+1)bit or longer mask for packet 1, PR20 and PR21 for packet 2, and PR30 and PR31 for packet 3 are executed sequentially. On the other hand, the method according to the present invention is executed as shown in FIG. 12. That is, node search processing PR10 for a k-bit or shorter mask is executed for packet 1 using the internal memory ML1 of LSI L1 and, then, node search processing PR11 for a (k+1)bit or longer mask is started for packet 1 using the external memory M1 of LSI L1. At the same time, node search processing PR20 for a k-bit or shorter mask is executed for packet 2 using the internal memory ML1 of LSI L1. After that, when processing PR20 and PR11 are finished, node search processing PR21 for a (k+1)bit or longer mask is executed for packet 2 using the external memory M1 of LSI L1. At the same time, node search processing PR20 for a k-bit or shorter mask is executed for packet 3 using the internal memory ML1 of LSI L1. Thereafter, packet search processing is executed similarly in pipeline mode.

The third high-speed method provides $2^P$ branches for one node to search for p bits at a time, in contrast to two branches for one node in the conventional method to search for one bit at a time. Thus, this method reduces the conventional search time by 1/p. In the description below, a node with $2^P$ branches is called a $2^P$-branch tree node.

A $2^P$-branch tree node is created by transforming a tree composed of conventional binary (2-branch) tree nodes. To transform a tree, one n-th bit 2-branch tree node and the (n+1)th to (n+p−1)th bit 2-branch tree nodes below the 2-branch tree node are made to correspond to a $2^P$-branch tree node. As an example, the transformation from a 2-branch tree to an 8-branch tree is shown in FIGS. 13 to 15.

Figure 13:
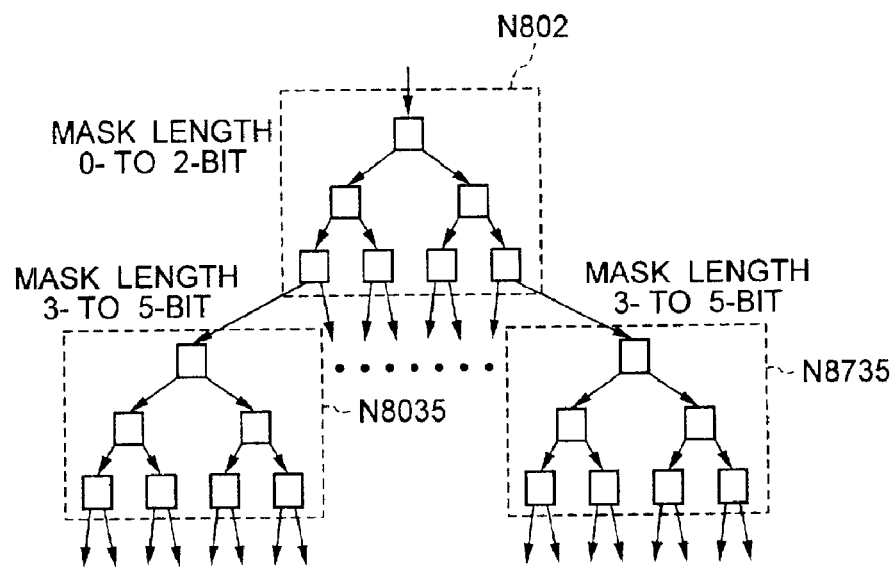
FIGS. 13–15 are diagrams showing 2-branch tree nodes to be transformed into one 8-branch tree node that are enclosed by dotted lines.

For an 8-branch tree, the bit positions of 2-branch tree nodes which are made to correspond to an 8-branch tree node is one of the following three:

(a) As shown in FIG. 13, 0-bit to 2-bit nodes, 3-bit to 5-bit nodes, 6-bit to 8-bit nodes, 9-bit to 11-bit nodes, 12-bit to 14-bit nodes, 15-bit to 17-bit nodes, 18-bit to 20-bit nodes, 21-bit to 23-bit nodes, 24-bit to 26-bit nodes, 27-bit to 29-bit nodes, and 30-bit to 32-bit nodes are each made to correspond to one 8-branch tree node.

Figure 14:
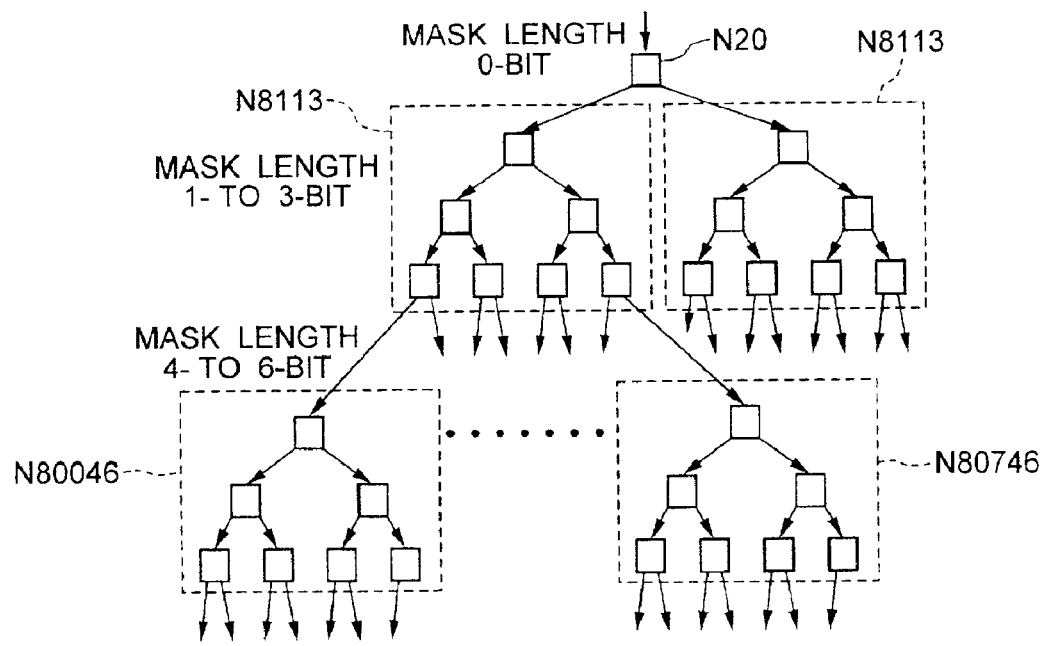
Figure 15:
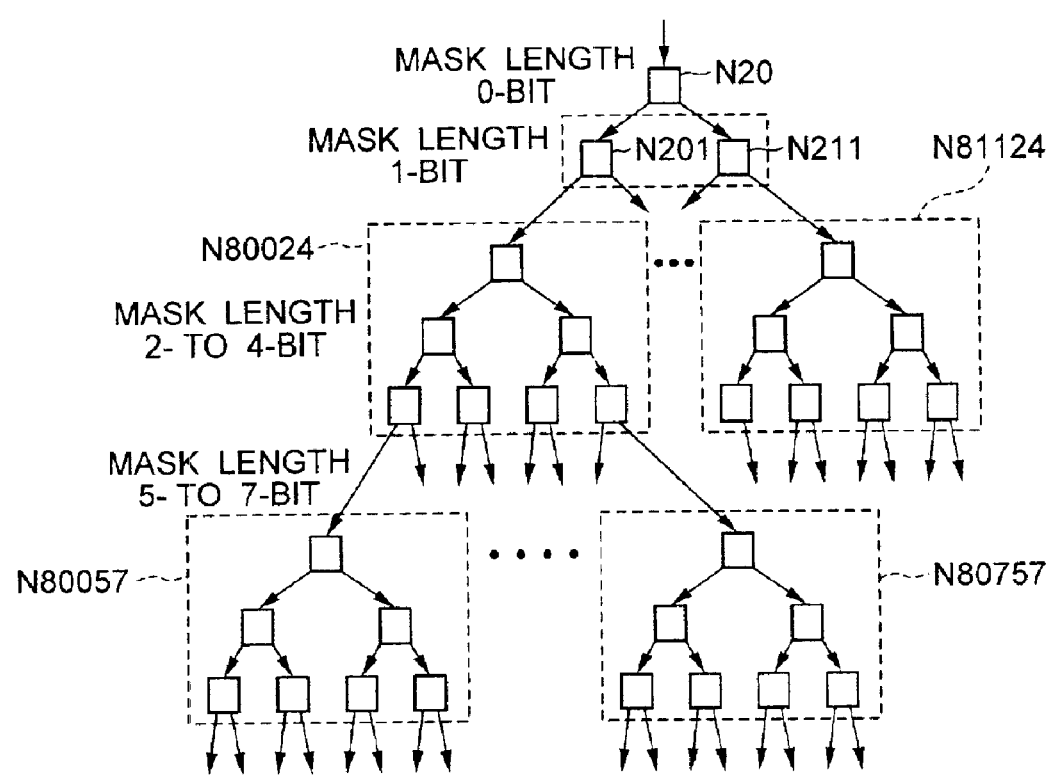

(b) As shown in FIG. 14, 1-bit to 3-bit nodes, 4-bit to 6-bit nodes, 7-bit to 9-bit nodes, 10-bit to 12-bit nodes, 13-bit to 15-bit nodes, 16-bit to 18-bit nodes, 19-bit to 21-bit nodes, 22-bit to 24-bit nodes, 25-bit to 27-bit nodes, 28-bit to 30-bit nodes, and 31-bit to 32-bit nodes are each made to correspond to one 8-branch tree node.

(c) As shown in FIG. 15, 2-bit to 4-bit nodes, 5-bit to 7-bit nodes, 8-bit to 10-bit nodes, 11-bit to 13-bit nodes, 14-bit to 16-bit nodes, 17-bit to 19-bit nodes, 20-bit to 22-bit nodes, 23-bit to 25-bit nodes, 26-bit to 28-bit nodes, 29-bit to 31-bit nodes, and 32-bit node are each made to correspond to one 8-branch tree node.

The tree may be configured in any bit division. To make path addition and deletion easy, one of the above three bit position divisions is used.

Figure 16:
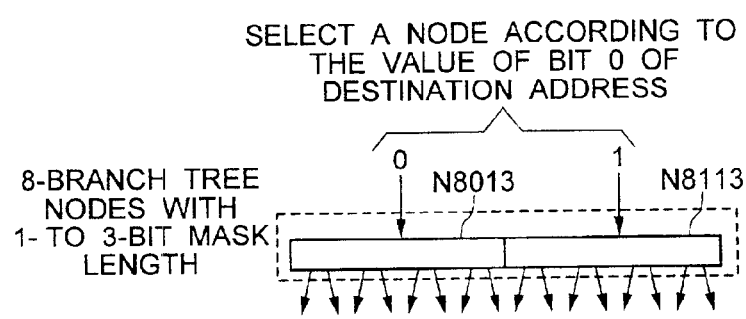
FIGS. 16 and 17 are diagrams showing the trees each of which is used to search for bits to the bit division position by expanding the first node into memory when bit positions are divided such that the first division does not start with mask length 0.
Figure 17:
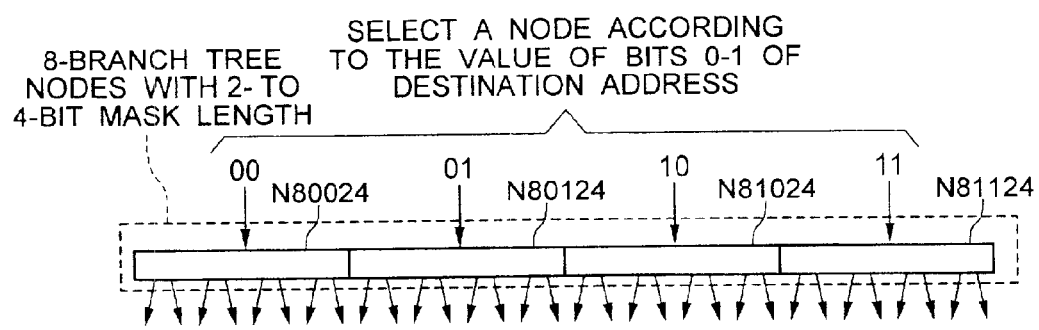

Out of the above three bit position divisions, the mask does not begin with bit 0 in the divisions other than the first. This means that the search for the first bit must be made separately. In this search, the method shown in FIG. 9, in which m-bit mask nodes are expanded into memory, is used. FIGS. 16 and 17 show the configuration of the trees whose first bits of the 8-branch tree nodes corresponding to the division positions corresponding to FIGS. 14 and 15 are expanded into memory.

In the configuration shown in FIG. 16, 1- to 3-bit mask nodes N8013 and N8113 are arranged in fixed positions in memory. One of them is selected according to whether bit 0 contains 0 or 1. In the configuration shown in FIG. 17, 2- to 4-bit mask nodes N80024, N80124, N81024, and N81124 are arranged in fixed positions in memory. One of them is selected according to whether bits 0–1 contain 00, 01, 10, or 11.

Figure 18:
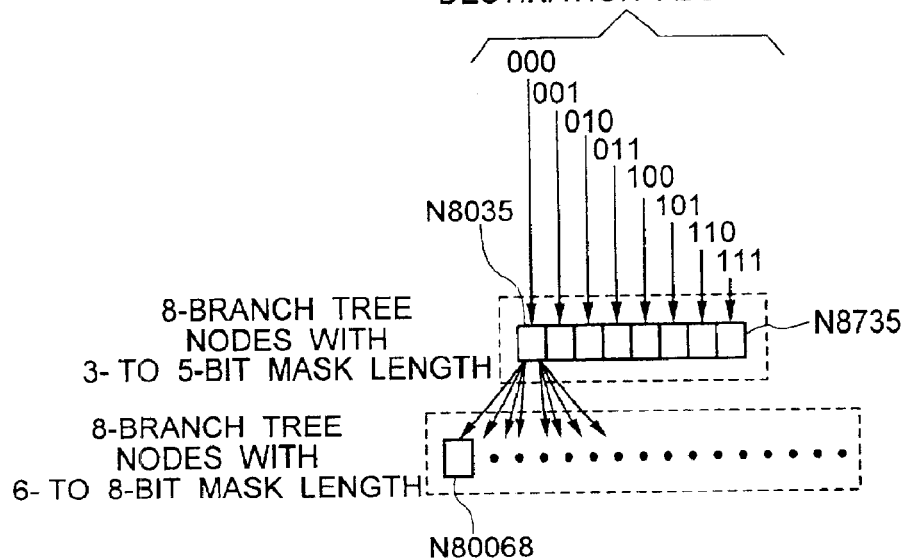
FIGS. 18–20 are diagrams showing trees that eliminate the search time of more starting bits by combining the method shown in FIGS. 16–17 and the method shown in FIG. 9.
Figure 19:
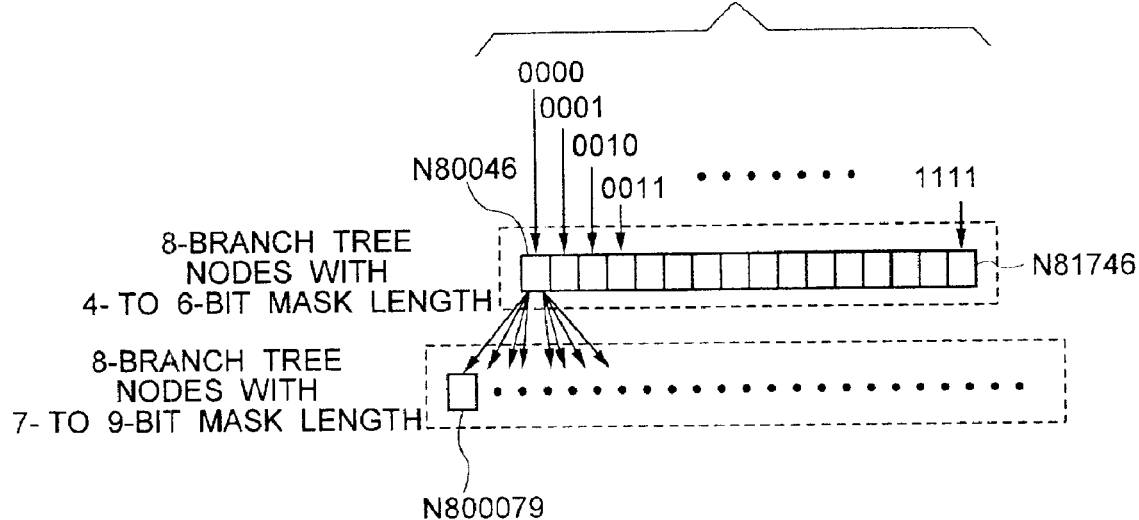
Figure 20:
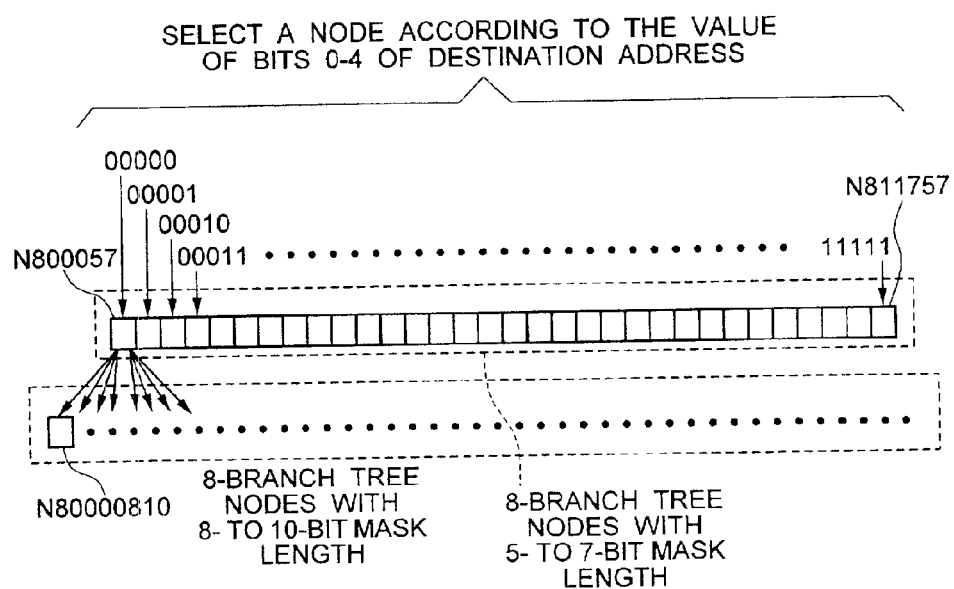
Figure 22:
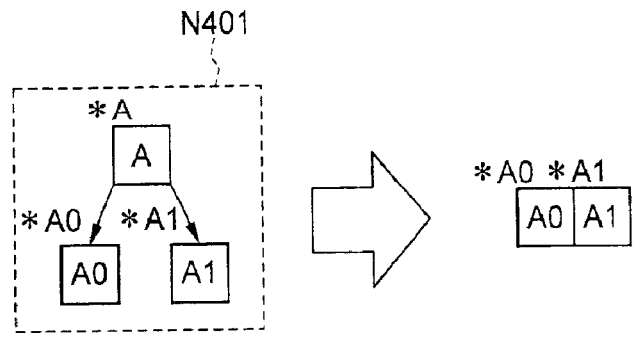
FIGS. 22–30 are diagrams showing how three 2-branch nodes, which are combined into one 4-branch tree node, are transformed into two 2-branch tree nodes.
Figure 23:
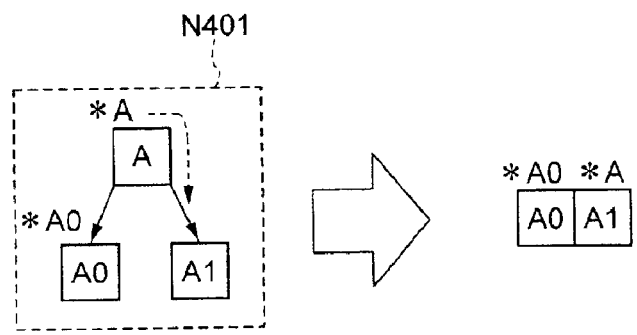
Figure 24:
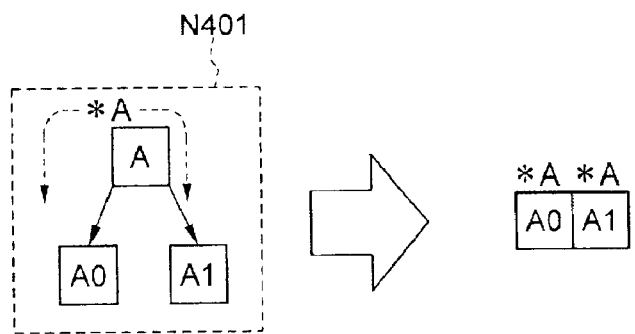
Figure 25:
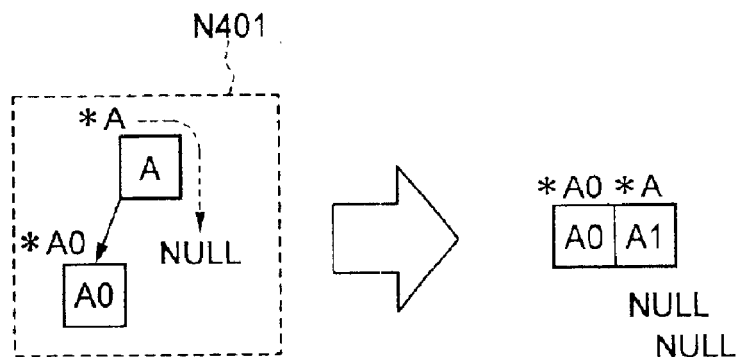
Figure 26:
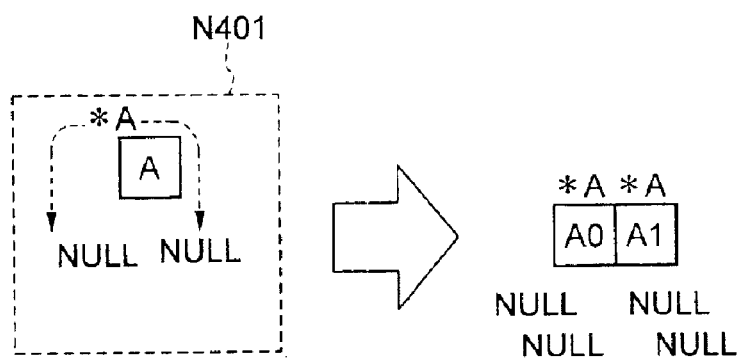
Figure 27:
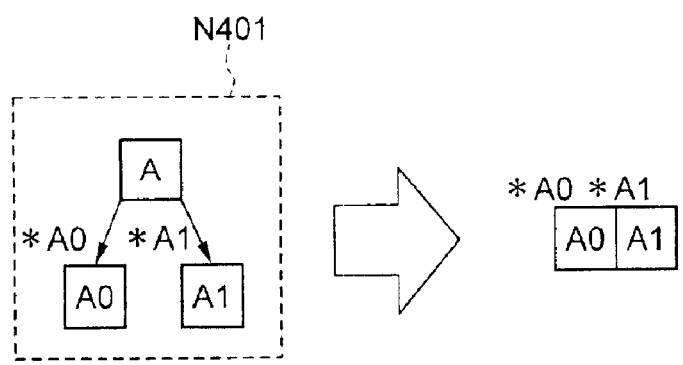
Figure 28:
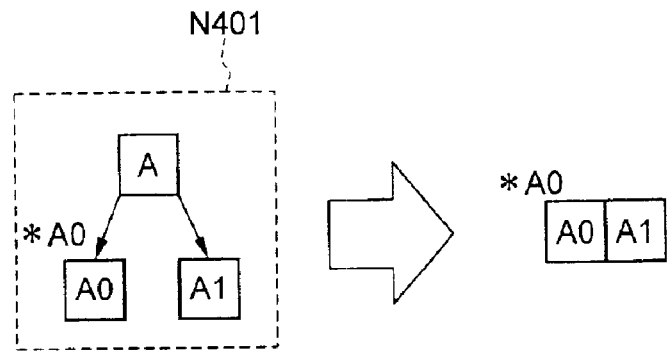
Figure 29:
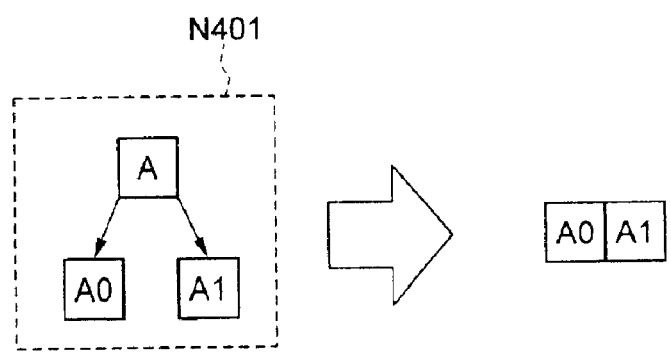
Figure 30:
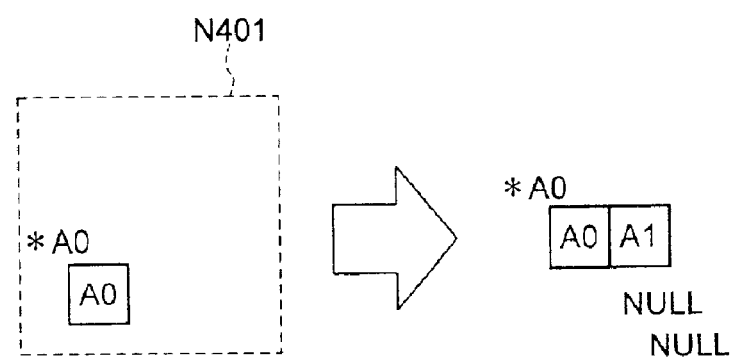

Or, the method shown in FIG. 9 in which the m-bit masks are expanded into memory may be combined with the method in which $2^P$-branch tree nodes are created to search for multiple number of bits at a time. More specifically, instead of arranging 1, 2, and 4 nodes from top to bottom in the bit division positions shown in FIGS. 13, 14, and 15, 8 times the number of nodes (8, 16, and 32), $8^2$ times the number of nodes (64, 128, 256), or, more in general, $8^q$ times the number of nodes may be used to eliminate the need for the first, second, or q-th search time of $2^P$ branch nodes. When p=3 and q=1, that is, when one node-search time is eliminated in the 8-branch tree nodes, FIGS. 18, 19, and 20 show node expansion in memory for the three bit division positions shown in FIGS. 13, 14, and 15. Increasing the values of p and q, like this, reduces the path search time but requires more memory. The values of p and q should be decided based on the trade-off between memory efficiency and performance.

Next, the method for configuring 4-branch tree nodes, 8-branch tree nodes, 16-branch tree nodes, or more in general, power-of-2-branch tree nodes will be described with reference to FIG. 21.

FIG. 21 shows a 4-branch tree. In this example, the 2-branch nodes, each composed of a total of three 2-branch tree nodes, that is, one 2-branch tree nodes A, B, C, D, or E and each respective two immediately lower 2-branch tree nodes A0, A1, B0, B1, C0, C1, D0, D1, E0, E1, are combined into one of 4-branch tree nodes N401, N4023, N4123, N4223, and N4323. A total of three 2-branch tree nodes are transformed into a node with the size of lower-level 2-branch tree nodes. This transformation is performed according to the path search specification, that is, when a match occurs on a plurality of paths each having its own mask length, the path with the longest mask length is used. In addition, this transformation is performed so that, when path search is made, the 2-branch path search matches the 4-branch path search result.

The node transformation of 4-branch tree nodes is shown in FIGS. 22–30.

When all three nodes are present (FIG. 22) and path information is allocated to all nodes, the path information *A0 and *A1 of the lower nodes are not deleted but the path information *A of the higher node is deleted. This is because, when a match occurs on the path of node A, a match always occurs on the path of node A0 or node A1. Therefore, *A is never used according to the path search specification which stipulates that, when a match occurs on a plurality of paths each having its own length, the path with the longer mask length is used.

When path information *A is allocated to higher node A but path information is not allocated to A1 of lower nodes A0 and A1 (FIG. 23), the path information *A of A is given to A1 as the path information. This also applies when a path is not allocated only to A0 of two lower nodes A0 and A1.

When a path is not allocated to both lower nodes A0 and A1 (FIG. 24), the path information A* of A is given to both A0 and A1 as the path information.

When there is no lower node A1 (FIG. 25), the corresponding node is supplied and the path information *A of higher node A is given to the supplied node. Because no lower node is connected node A1, NULL is set in the pointer to the lower node of node A1. This also applies when a path is not allocated only to A0 of two lower nodes A0 and A1.

When there is no lower node, neither A0 nor A1 (FIG. 26), both nodes are supplied, the path information *A of A is given to them, and NULL is given to the pointers to the nodes below them.

When a path is not allocated to the higher node (FIG. 27), the higher node is discarded.

When path information *A is not allocated to node A and, for the lower nodes A0 and A1, a path is not allocated to A1 (FIG. 28), A1 has no path information even in a 4-branch node tree. This also applies when a path is not allocated to A0 of lower nodes A0 and A1.

When a path is not allocated to both lower nodes A0 and A1 (FIG. 29), there is no path information for both nodes in the 4-branch tree node.

When there is lower node A0 only (FIG. 30), lower node A1 is supplied. This also applies when there is lower node A1 only.

The same transformation is performed also for an 8-branch tree. That is, a total of seven 2-branch tree nodes are transformed into a node with the size of four lowest-level 2-branch tree nodes. FIG. 31 shows two examples of transforming three higher 2-branch tree nodes.

FIG. 31($a$) shows an example in which all seven 2-branch tree nodes to be combined into one are present but path information is not allocated to some of them. Out of four lowest nodes, path information is not allocated to A01 and A10. To these nodes, the path information *A and *A1, which are their nearest higher nodes to which path information is allocated, that is, the path information with the longest mask nodes (A and A1, respectively), is given.

FIG. 31($b$) shows an example in which some of seven 2-branch tree nodes to be combined into one are not present. In this case, missing nodes A01 and A10 are first supplied as nodes to which path information is not allocated and then path information is given to them according to the rule used in the example in FIG. 31($a$). Because, out of lowest four nodes A00, A01, A10, and A11, the supplied nodes A01 and A10 have no lower nodes, NULL is set in the pointers to the lower nodes.

In general, the method described above is also used for a $2^P$-branch tree. ($2^P-1$) 2-branch tree nodes are transformed into a node with the size of the lowest-level $2^P-1$ nodes.

Reducing the size of a node in this manner prevents memory efficiency from decreasing. In the following example, the memory amount required when a tree is created as a 2-branch tree under the approximation condition given below and the memory amount required when a tree is created as a $2^P$-branch tree are calculated. This example shows that a $2^P$-branch does not decrease memory efficiency, especially when p is small.

Approximation:
1. In a 2-branch tree, paths are allocated only to the end nodes.
2. All 32 bits have branches.
3. An increase in the number of branches is fixed for all bits.
4. The number of paths is about 10k.

Figure 32:
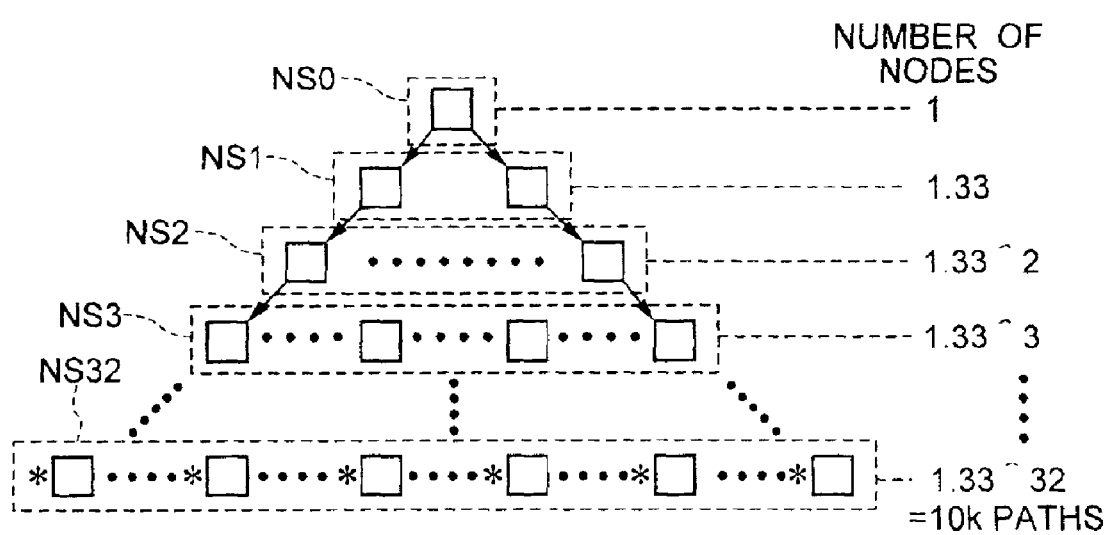
FIG. 32 is a diagram showing a model of tree expansion when the memory amount of a tree is estimated.

FIG. 32 shows the form of a tree configured under the approximation condition. According to this approximation, the tree becomes $10K^{(1/32)}$ times larger, that is, about 1.33 times larger, each time the tree goes down one-bit hierarchical level.

Referring to FIG. 33($a$), the memory amount required when the tree is composed of 2-branch tree nodes and the memory amount required when the tree is composed of 4-branch tree nodes are compared. As shown in the figure, N2, one of three 2-branch tree nodes constituting the 4-branch tree node, has about 1.33 immediately lower nodes. That is, the node has right and left nodes, N20 and N21, each with a probability of 0.67. Therefore, with the node presence probability taken into consideration, the average of the total amount of memory required for 2-branch tree nodes N2, N20, and N21 constituting the 4-branch tree node is the memory amount required for (1+1.33) 2-branch tree nodes, that is, 2.33 2-branch tree nodes. When constituting the tree with 4-branch tree nodes, these three 2-branch tree nodes are combined into one 4-branch tree node N4. The memory amount required for this one 4-branch tree node equals the memory amount required for two 2-branch tree nodes, N20 and N21.

Similarly, referring to FIG. 33($b$), the memory amount required when the tree is composed of 2-branch tree nodes and the memory amount required when the tree is composed of 8-branch tree nodes are compared. As shown in the figure, N2, the highest node of seven 2-branch tree nodes N2, N20, N21, N200, N201, N210, and N211 constituting the 8-branch tree nodes, has about 1.33 immediately lower nodes, N20 and N21, which in turn have about 1.332, that is, about 1.78, lower nodes, N200, N201, N210, and N211. Therefore, with the node presence probability taken into consideration, the average of the total amount of memory required for 2-branch tree nodes N2, N20, N21, N200, N201, N210, and N211 constituting the 8-branch tree nodes is the memory amount required for (1+1.33+1.78) 2-branch tree nodes, that is, 4.11 2-branch tree nodes.

When constituting the tree with B-branch tree nodes, these seven 2-branch tree nodes are combined into one 8-branch tree node N8. The memory amount required for this one 8-branch tree node equals the memory amount required for four 2-branch tree nodes, N200, N201, N210 and N211.

The following shows the memory amount comparison between a 2-branch tree and 4-, 8-, 16-, 32-, 64-, 128-, and 256-branch trees that is made in the manner described above.

2-branch tree: 4-branch tree=2.33: 2=0.86 times
2-branch tree: 8-branch tree=4.11: 4=0.97 times
2-branch tree: 16-branch tree=6.48: 8=1.23 times
2-branch tree: 32-branch tree=9.65: 16=1.66 times
2-branch tree: 64-branch tree=13.86: 32=2.31 times
2-branch tree: 128-branch tree=19.49: 64=3.28 times
2-branch tree: 256-branch tree=26.98: 128=4.74 times.

When the number of paths is 1M, the tree becomes $1M^{(1/32)}$ times larger, that is, about 1.54 times larger, each time the tree goes down one-bit hierarchical level. The memory amount ratios between the 2-branch tree and the 4-, -8-, 16-, 32-, 64-, 128-, and 256-branch tree are as follows:

2-branch tree: 4-branch tree=2.54: 2=0.79 times
2-branch tree: 8-branch tree=4.91: 4=0.81 times
2-branch tree: 16-branch tree=8.56: 4=0.93 times
2-branch tree: 32-branch tree=14.19: 16=1.13 times
2-branch tree: 64-branch tree=22.85: 32=1.40 times
2-branch tree: 128-branch tree=36.18: 64=1.77 times
2-branch tree: 256-branch tree=56.72 128=2.26 times.

The result is that, under the above assumption, memory usage efficiency is increased for up to an 8-branch tree when the number of paths is 10k, and for up to a 16-branch tree when the number of paths is 1M. Even for a 256-branch tree, the required memory amount is 3.28 times that of a 2-branch tree when the number of paths is 10k, and 2.26 times when the number of paths is 1M. The memory usage efficiency remains high for the following reasons:

(1) Combining p-level nodes into one makes the memory of combined nodes more compact than the memory of nodes before being combined. That is:
Three 2-branch tree nodes become a 4-branch tree node with the size two times the 2-branch tree node. Seven 2-branch tree nodes become an 8-branch tree node with the size four times the 2-branch tree node. 15 2-branch tree nodes become a 16-branch tree node with the size eight times the 2-branch tree node. 31 2-branch tree nodes become a 32-branch tree node with the size 16 times the 2-branch tree node. 63 2-branch tree nodes become a 64-branch tree node with the size 32 times the 2-branch tree node. 127 2-branch tree nodes become a 128-branch tree node with the size 64 times the 2-branch tree node. 255 2-branch tree nodes become a 256-branch tree node with the size 128 times the 2-branch tree node.

(2) The tree expands as the tree goes down one bit level, increasing the usage efficiency of data in one node (As the number of supported paths increases, the tree expands more and usage efficiency of data in one node increases).

In addition, a 4-branch tree node, 8-branch tree node, 16-branch tree node, and so on, each handle 2, 4, 8, . . . 2-branch tree nodes at a time. Thus, for an element that may be shared among the combined 2-branch tree nodes, only one such element is required. This reduces the amount of memory required for a 4-branch tree node, 8-branch tree node, 16-branch tree node, and so on. Examples of an element that may be shared among combined 2-branch tree nodes are a sub-network address and a sub-network mask length. As will be described later, the sub-network mask length is not the sub-network mask length of the node itself but that of the node immediately below the node. Therefore, the memory amount is not reduced much.

Figure 34:
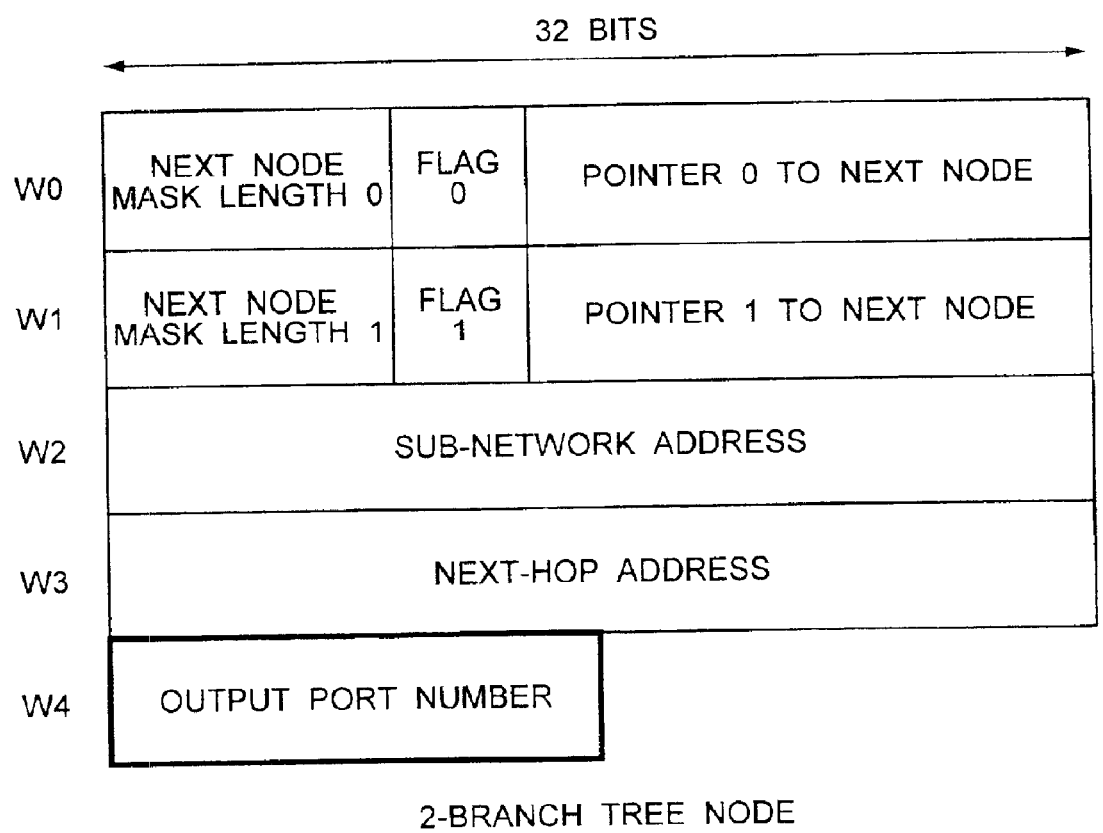
FIG. 34 is a diagram showing the structure of a 2-branch tree node.
Figure 35:
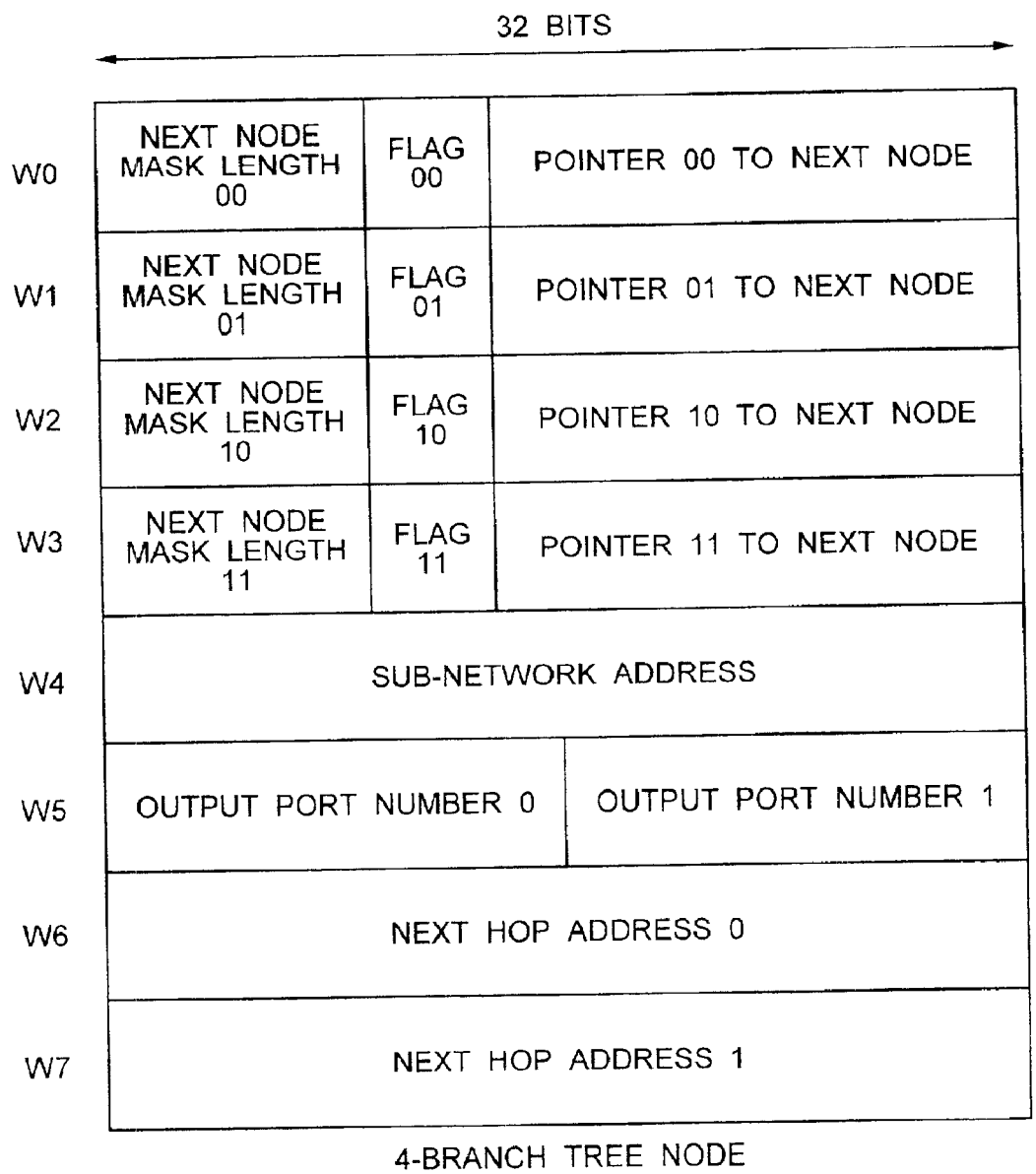
FIG. 35 is a diagram showing the structure of a 4-branch tree node.

FIGS. 34 and 35 show, respectively, the structure of a 2-branch tree node and the structure of a 4-branch tree node which is generated by combining two 2-branch tree nodes and which has only one network address that may be shared between two combined 2-branch tree nodes. FIG. 34 is a diagram showing the structure of a 2-branch tree node. The next node mask length 0 field and the next node mask length 1 field contain, not the sub-network mask length of this node, but the sub-network mask length of the nodes immediately below this node. The mask lengths of the nodes immediately below, not that of the node itself, are set in those fields for fast access. This will be described later with reference to FIG. 36. Flag 0 and Flag 1 each contain a bit indicating whether the sub-network corresponding to this node connects directly to the router or via one or more routers. Also, as will be described later with reference to FIG. 37, those flags contain information indicating, for example, whether or not a path is allocated to this node, that is, whether or not "*" is attached to this node as in the example of the tree shown in FIG. 8. Flag 0 and Flag 1 contain the same value. This is because only one of word W0 and word W1 need be read. Speeding up processing by reading only a part of a node, instead of reading the entire node, will be described later with reference of FIG. 36. The pointer 0 to next node field and the pointer 1 to next node field each contain a pointer to the next node to be reached when the value of the bit position of the destination address indicated by the mask length of this node is 0 or 1. The sub-network address field contains the sub-network address corresponding to the node. The output port number field and the next-hop address field contain path information allocated to this node. The next-hop address field contains the address of the port from which the received packet is to be output, and output port number field contains the address of the router to which the packet on that port is to be sent.

A 4-branch tree node is structured to have two 2-branch tree nodes and to have only one copy of data that may be shared. The sharable data is the sub-network address only. FIG. 35 shows the structure of a 4-branch tree node created in this method.

In the examples shown in FIGS. 34 and 35, a 2-branch tree node is a little bit larger than 16 bytes that is a power of 2. A 4-branch tree node, with only one sub-network address in one node, allows the node to be contained in 32 bytes that is a power of 2. An 8-branch tree node, with only one sub-network address in one node, allows the node to be contained in 64 bytes and makes an extra 4-byte field available for use in storing other information. Increasing the number of 2-branch tree nodes that are combined into one further reduces the size of a node with respect to the magnitude of a power of 2.

As described above, when the size of one node is within a power of 2, the hardware configuration becomes very simple. Some examples in which the hardware configuration becomes simple, as well as their benefits, will be described.

As the first example., consider a case in which a 4-branch tree node is contained in 32 bytes. In this case, even when the memory is composed of a plurality of banks, a one-node memory area does not extend across the bank boundary. In addition, even when a dynamic RAM is used as the memory, a one-node memory area does not extend across the row address boundary.

As the second example, when finding the address of an element in a node, the value of the pointer to the node need not be added to the offset from the address pointed to by the pointer. Instead, the value in the high-order bits of the address are used as the pointer to the node, and the value of the low-order bits are used as the offset. For example, when a 4-branch tree node is contained in 32 bytes, the address of an element in a node may be represented by allocating the pointer to the node in the $2^5$ or higher bit positions and allocating the address of the offset of the element within the node in the $2^0$ to $2^0$ bit positions.

As the third example, when a 4-branch tree node is contained, for example, in 32 bytes, the start address of the next node divided by 32 may be contained in each node as the pointer to the next node. This reduces 5 bits for each pointer in one node.

One of the problems with this method is that, when 4-branch tree nodes, 8-branch tree nodes, 16-branch tree nodes, and so on are used, the size of each node increases. The increase in the size of a node increases the time required to read one node into the search processing LSI during search time, degrading performance. This problem may be solved by reading only a part of the node instead of reading the whole node. This method will be described with reference to FIG. 36.

Figure 36:
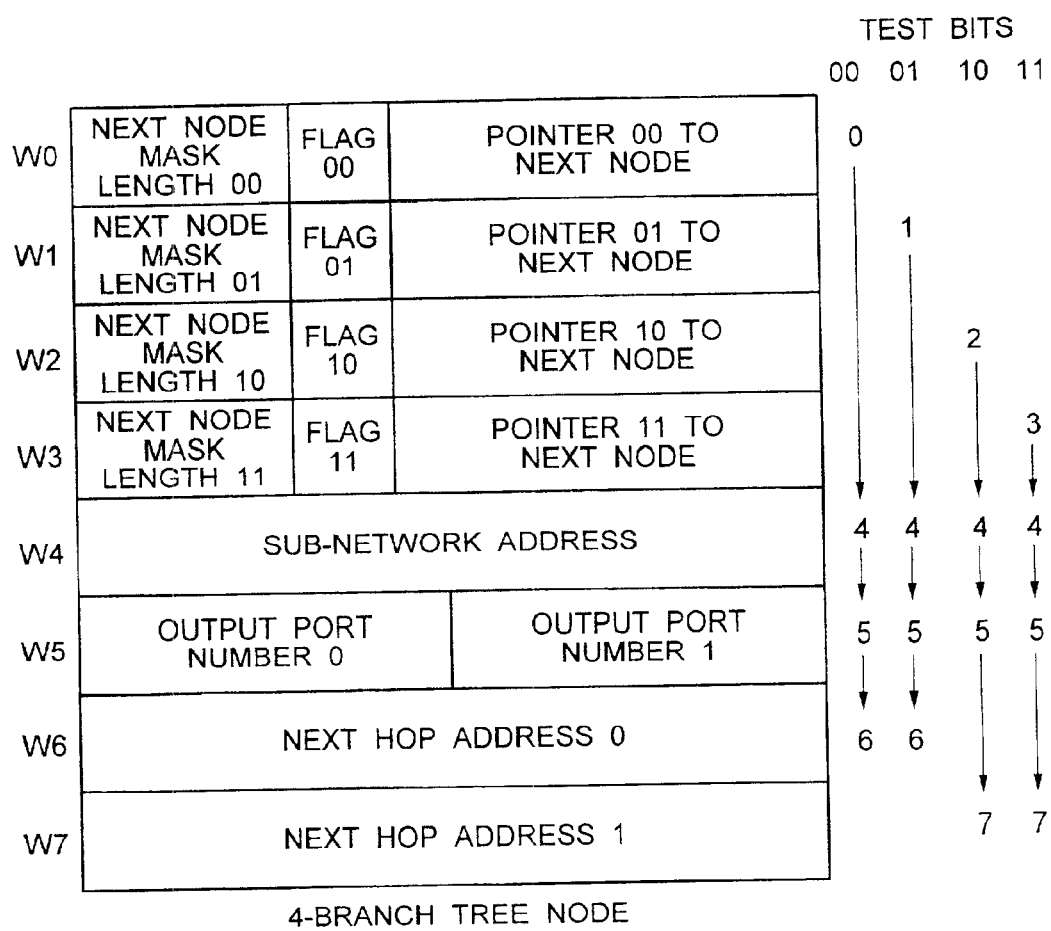
FIG. 36 is a diagram showing a method for reading only a part, not the whole, of a node to prevent an increase in the node data read time when the node becomes large.

FIG. 36 shows an example of a 4-branch tree node. As shown in FIGS. 34 and 35, a m-bit mask 4-branch tree node has a form established by combining a 2-branch tree node whose bit m of the destination address is 0 and a 2-branch tree node whose bit m of the destination address is 1. Therefore, this method, which checks bit m of the destination address and then reads only the corresponding 2-branch tree node, reads only the data amount equivalent to that of a 2-branch tree node even if the node size increases. In this case, as shown in FIG. 35, the sub-network address which is shared by the combined 2-branch tree nodes is read regardless of the value of bit m of the destination address.

In addition, the method checks the value of bit m+1 of the destination address to read only one of two next-node pointers contained in the 2-branch tree node, further decreasing the amount of data to be read.

This method applies also to a 2-branch tree node. For example, for a m-th bit 2-branch tree node, the method checks the value of: bit m of the destination address and reads only one of two next-node pointers.

After the method described above is executed and the node mask length is m, data is read in order of (W0→W4→W5→W6), (W1→W4→W5→W6), (W2→W4→W5→W7), or (W3→W4→W5→W7) according to whether the value of bits m and m+1 is 00, 01, 10, or 11.

As described above, reading a part of a node requires the information on the mask length m of the node. The mask length m of the node must be read first when one-node data is read, or the mask length, which is moved to the preceding node, must be read when the preceding-node data is read. In the method in which the node mask length m is read first when one-node data is read, there are two delay factors: one is the gate delay of the search processing LSI for extracting the value of bit m of the destination address and the other is the memory read latency between the time the address of data to be read next is output to memory and the time data is read from memory into the search processing LSI. These delay factors cause a delay between the time the mask length m is read and the time data to be read next is selected and read. Therefore, reading only a part of a node in this method does not increase performance much. The method in which the node mask length m is moved to the preceding node and the preceding node is read provides better performance.

In addition, when the mask length m of a node is moved to the preceding node, one-node data should be read in order of the next-node mask length m, pointer to the next node, next sub-network address, output port number, and next hop address. This order allows the address of data to calculated most quickly.

The pointer to the next node points to the start of the next node memory area. The offset from the start of the next node to the address of the part to be read first may be obtained by reading the mask length m of the next node and then checking the value of the corresponding bit position of the destination address.

Figure 37:
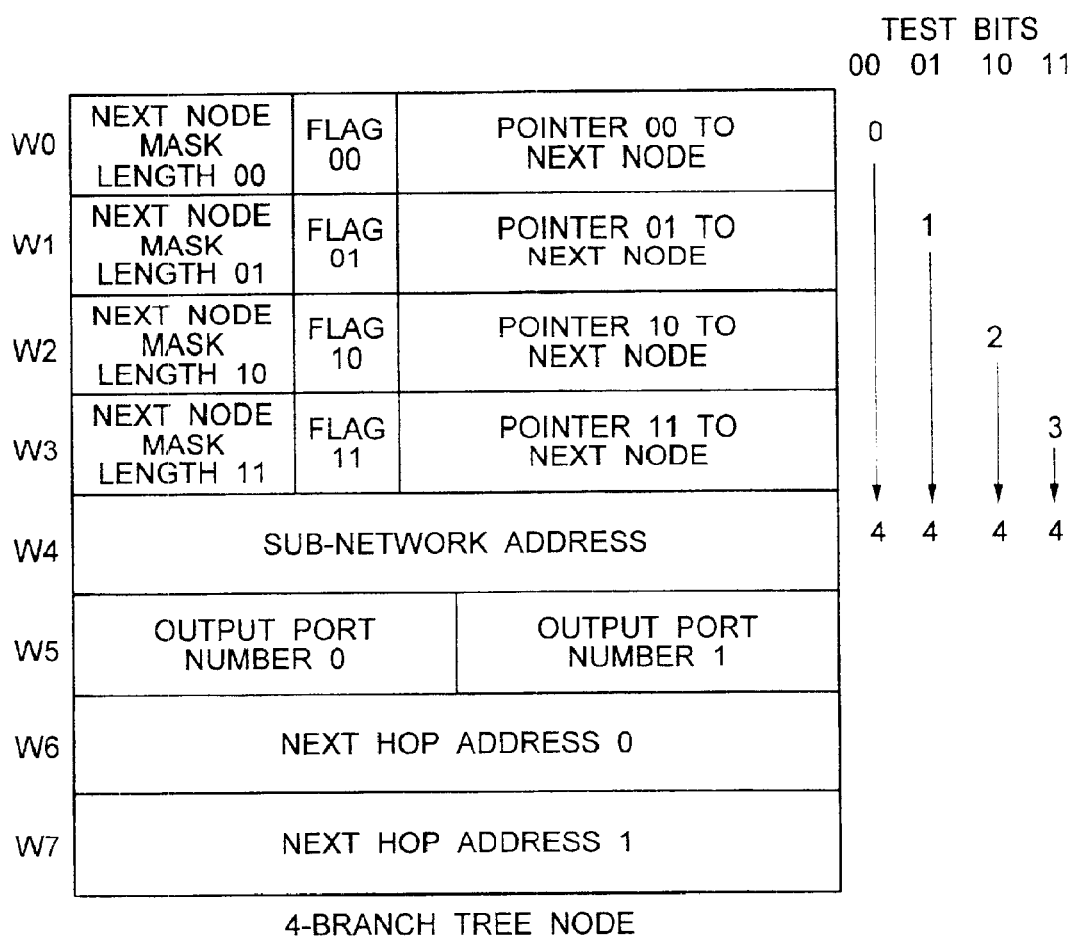
FIG. 37 is a diagram showing a method for not reading an element that is not necessary depending upon a condition to reduce the read time and to increase processing speed.

Next, referring to FIG. 37, the following describes how the read time is reduced and the processing speed is increased by not reading an element in one node that is not required depending upon the condition.

FIG. 37 shows an example of a 4-branch tree node. The Radish algorithm does not always allocate a path to all nodes and requires that a node be provided at a branch even if a path is not allocated thereto. As shown in FIG. 37, the flag, which is a part of node data that is read first, contains information indicating whether or not a path is allocated to the node. And, in a node to which a path is not allocated, the output port and the next hop address are not read to reduce the read time. Because the information indicating whether or not a path is allocated to the node may be represented by one bit, the increase in time required to read this information is small.

When the mask length of this node is m, this method reads W0 if the value of bits m to m+1 of the destination address is 00. If Flag 00 indicates that there is no path information for the 0th 2-branch constituting the 4-branch tree, the method reads only W4. Only when it is found that there is path information, the method reads data in order of W4, W5, and W6 as shown in FIG. 36. This also applies when the value of bits m to m+1 of the destination address is 01, 10, or 11.

INDUSTRIAL APPLICABILITY

As described above, the present invention provides a network next-hop search method for use in a network forwarding device, such as a router, and a network forwarding device using the method. This method allows a network forwarding device to quickly search for the forwarding address of a received packet to increase the packet processing performance of the network forwarding device.

What is claimed is:

1. A network forwarding device connecting a plurality of networks comprising:
   a port to which one of said networks is connected;
   a network interface connected to said port and controlling an interface with the network connected to said port; and
   a routing processor connected to said network interface via an intra-device communication line and performing routing of a: packet received from said network interface;
   wherein said routing processor includes:
   path information generating unit for generating path information comprising a plurality of 2-branch tree nodes, each corresponding to a value which can be taken by each bit of a destination address of said packet;
   path information holding means for holding said path information generated; and next-path searching means for checking each bit of said destination address of said packet received from a high-order bit one by one and determining a path to which said packet received is to be forwarded next by retrieving said 2-branch tree nodes of said path information corresponding to each bit value of said destination address; and wherein, said path information generating unit combines a total of ($2^P$−1) 2-branch tree nodes comprising one 2-branch tree node and 2-branch tree nodes of (p−1) levels connected to said one 2-branch tree node, into one $2^P$-branch tree node and outputs said one $2^P$-branch tree node as said path information to said path information holding means, wherein said p is an integer equal to or larger than 2, and wherein said next-path searching means checks p bits of said destination address of said packet received at one time and retrieves $2^P$-branch tree node corresponding to values of said p bits.

2. The network forwarding device according to claim 1 wherein said $2^P$-branch tree node is formed by combining $2^{(P-1)}$ 2-branch tree nodes, and said $2^P$-branch tree node comprises path data included in said ($2^{P-1}$) 2-branch tree nodes, and when each of said ($2^{P-1}$) 2-branch tree nodes includes the same data, said $2^P$-branch tree node comprises said same data as one data.

3. The network forwarding device according to claim 2 wherein said next-path searching means does not read a whole node when reading the $2^P$-branch tree node from said path information holding means but reads only data corresponding to one of the 2(P-0.1) 2-branch tree nodes combined when the $2^P$-branch tree node was created.

4. The network forwarding device according to claim 3, wherein said path information generating unit stores mask length corresponding to said $2^P$-branch tree node, not mask length corresponding to other $2^P$-branch tree node storing a pointer for said $2^P$-branch tree node, and wherein said next-path searching means comprehends mask length corresponding to said $2^P$-branch tree node to be read later, when data of said other $2^P$-branch tree node is read and selects a portion of data to be read from said $2^P$-branch tree node according to values of p bits beginning from a bit position indicated by said mask length in said destination address of said packet received.

5. The network forwarding device according to claim 3 wherein said $2^P$-branch tree node comprises a flag as a data which is first read by said next-path searching means, said flag indicating whether or not a path is allocated to said $2^P$-branch tree node, and wherein when said next-path searching means reads said $2^P$-branch tree node from said path information holding means, said flag is first read, and when said flag indicates that a path is not allocated, said next-path search means does not read path data.

6. The network forwarding device according to claim 1 wherein said network forwarding device is a router.

7. The network device according to claim 1, wherein said path information generating unit generates $2^m$ $2^P$-branch tree nodes ($2^m \times (2^P-1)$) 2-branch tree nodes, said $2^m$ $2^P$-branch tree nodes respectively corresponding to mask lengths from m bit to (m−(p−1)) bit, wherein said m is a natural number, and wherein each $2^P$-branch tree node is stored in a predetermined region of said path information holding means, and wherein said next-path searching means selects one region among regions storing each $2^P$-branch tree node according to a value represented by bits 0-th bit to (m−1)th bit of said destination address of said packet received, and reads one $2^P$-branch tree node from said region selected in said path information holding means.

8. A network forwarding device connecting a plurality of networks comprising:

a port to which one of said networks is connected;

a network interface connected to said port and controlling an interface with the network connected to said port; and a routing processor connected to said network interface for performing routing of a packet received from said network interface;

a management unit connected to said routing processor via an intra-device communication line for generating path information and delivering said path information to said routing processor, said path information including a plurality of 2-branch tree nodes, each corresponding to a value can be taken by each bit of a destination address of a packet;

wherein said routing processor includes:

a memory for holding said path information delivered from said management unit; and next-path searching means for checking each bit of said destination address of said packet received from a high-order bit one by one and determining a path to which said packet received is to be forwarded next by retrieving said 2-branch tree nodes of said path information corresponding to each bit value of said destination address; and wherein, said management unit combines a total of ($2^P$−1) 2-branch tree nodes comprising one 2-branch tree node and 2-branch tree nodes of (p−1) levels connected to said one 2-branch tree node, into one $2^P$-branch tree node and delivers said one $2^P$-branch tree node as said path information to said routing processor, wherein said p is an integer equal to or larger than 2, and wherein said next-path searching means checks p bits of said destination address of said packet received at one time and retrieves said $2^P$-branch tree node corresponding to values of said p bits.

9. A network next-hop search method for use in a network forwarding device connected to a plurality of network and transmitting a packet received from one of said networks to a next hop based on path information comprising the steps of:

generating path information comprising a plurality of 2-branch tree nodes, each corresponding to a value which can be taken by each bit of a destination address of a packet;

holding said path information generated;

checking bits of said destination address of said packet received from a high-order bit one by one and retrieving said 2-branch tree nodes corresponding to each bit value; and determining a path to which said packet received is to be forwarded next wherein, said step of generating a path information combines a total of ($2^P$−1) 2-branch tree nodes comprising one 2-branch tree node and 2-branch tree nodes of (p−1) levels connected to said one 2-branch tree node, into one $2^P$-branch tree node as said path information, wherein p is an integer equal to or larger than 2, and said step of retrieving checks p bits of said destination address of said packet received at one time and retrieves said $2^P$-branch tree node corresponding to values of said p bits.

* * * * *